United States Patent [19]

Ische et al.

[11] Patent Number: 5,888,385
[45] Date of Patent: Mar. 30, 1999

[54] VEHICLE COOLANT RECYCLING

[75] Inventors: Kenneth W. Ische, Egan; Michael W. Johnson, St. Paul; William S. Dea, Bloomington; Thomas D. Chandler, Coon Rapids, all of Minn.

[73] Assignee: Century Manufacturing Company, Minneapolis, Minn.

[21] Appl. No.: 684,470

[22] Filed: Jul. 19, 1996

Related U.S. Application Data

[62] Division of Ser. No. 362,326, Dec. 22, 1994, Pat. No. 5,549,832.

[51] Int. Cl.[6] .............................. B01D 29/56; C02F 1/28; C02F 9/00; C02F 1/56
[52] U.S. Cl. .................. 210/167; 210/201; 210/202; 210/203; 210/206; 210/220; 210/196; 210/257.1; 210/258; 210/259; 210/314; 210/335; 210/266; 134/169 A
[58] Field of Search ..................................... 210/258, 259, 210/167, 295, 314, 201, 203, 206, 220, 196, 257.1, 335, 202, 266; 134/169 A; 165/95

[56] References Cited

U.S. PATENT DOCUMENTS 4,946,595  8/1990  Miller.
5,174,902  12/1992  Shubert.
5,223,144  6/1993  Woyciesjes.
5,422,008  6/1995  Woyciesjes.

*Primary Examiner*—Thomas M. Lithgow
*Attorney, Agent, or Firm*—Dorsey & Whitney

[57] ABSTRACT

An apparatus for the treatment and recovery of spent vehicle coolant that involves the following steps:

a) removing the spent coolant from the engine;

b) treating the spent coolant with sodium dimethyldithiocarbamate to cause dissolved metals therein to form insoluble particles;

c) treating the spent coolant of step b) with an aqueous basic coagulating agent such as a polyquaternary ammonium compound in its hydroxide form;

d) filtering the spent coolant from step c) through a set of filters and then through a bed of carbon particles, to produce a relatively cleaner liquid; and e) adding to the relatively clear liquid a combination of corrosion inhibitors, buffering agents and alkali, whereby the treated coolant can be recycled to the vehicle for effective coolant performance therein.

8 Claims, 14 Drawing Sheets

| Fig. 1a | Fig. 1b |
|---------|---------|
| Fig. 1c | Fig. 1d |

| Fig. 2b | Fig. 2c |
|---------|---------|
| Fig. 2d | Fig. 2e |

| Fig. 3a | Fig. 3b |
|---------|---------|
| Fig. 3c | Fig. 3d |

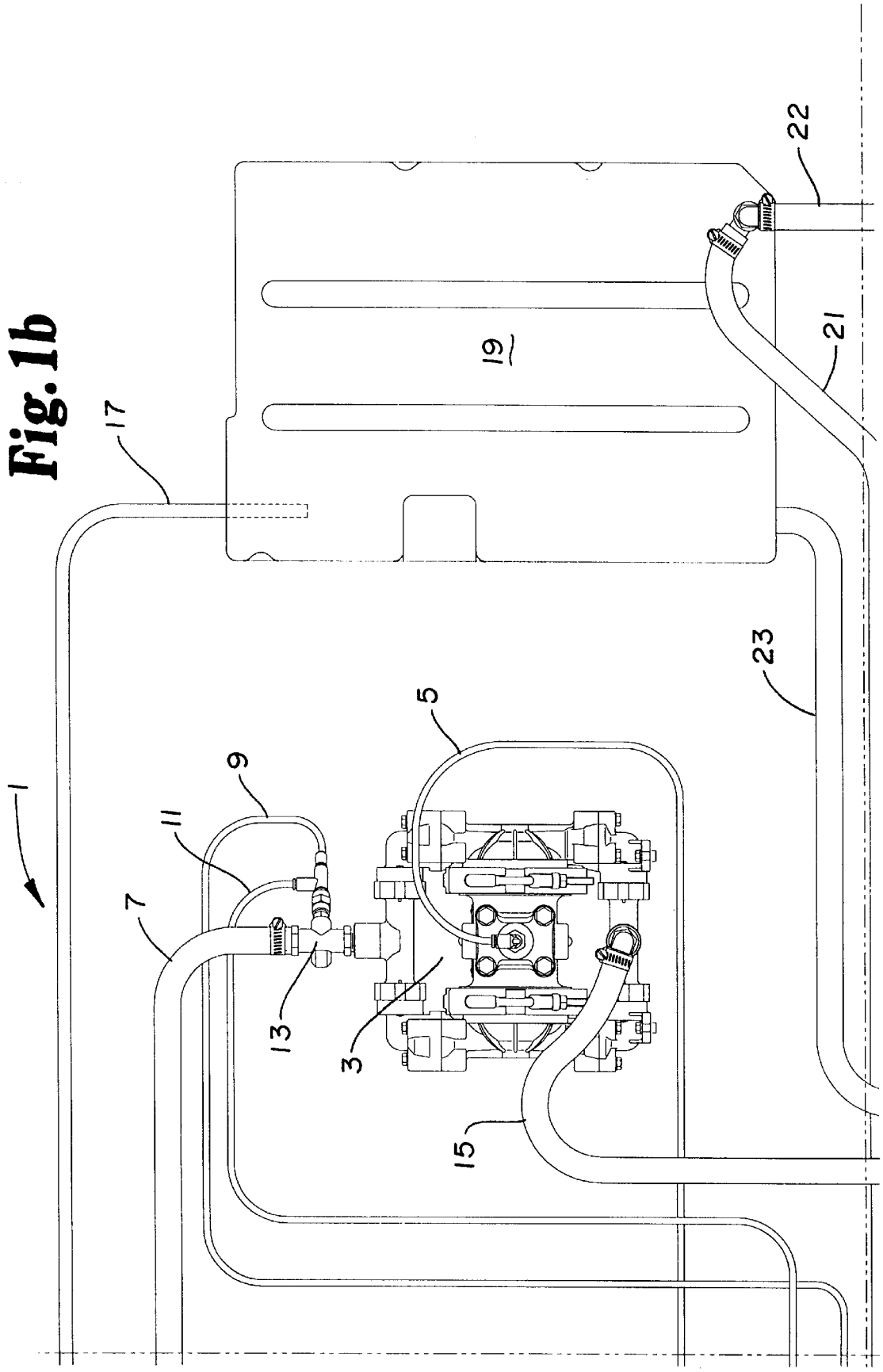

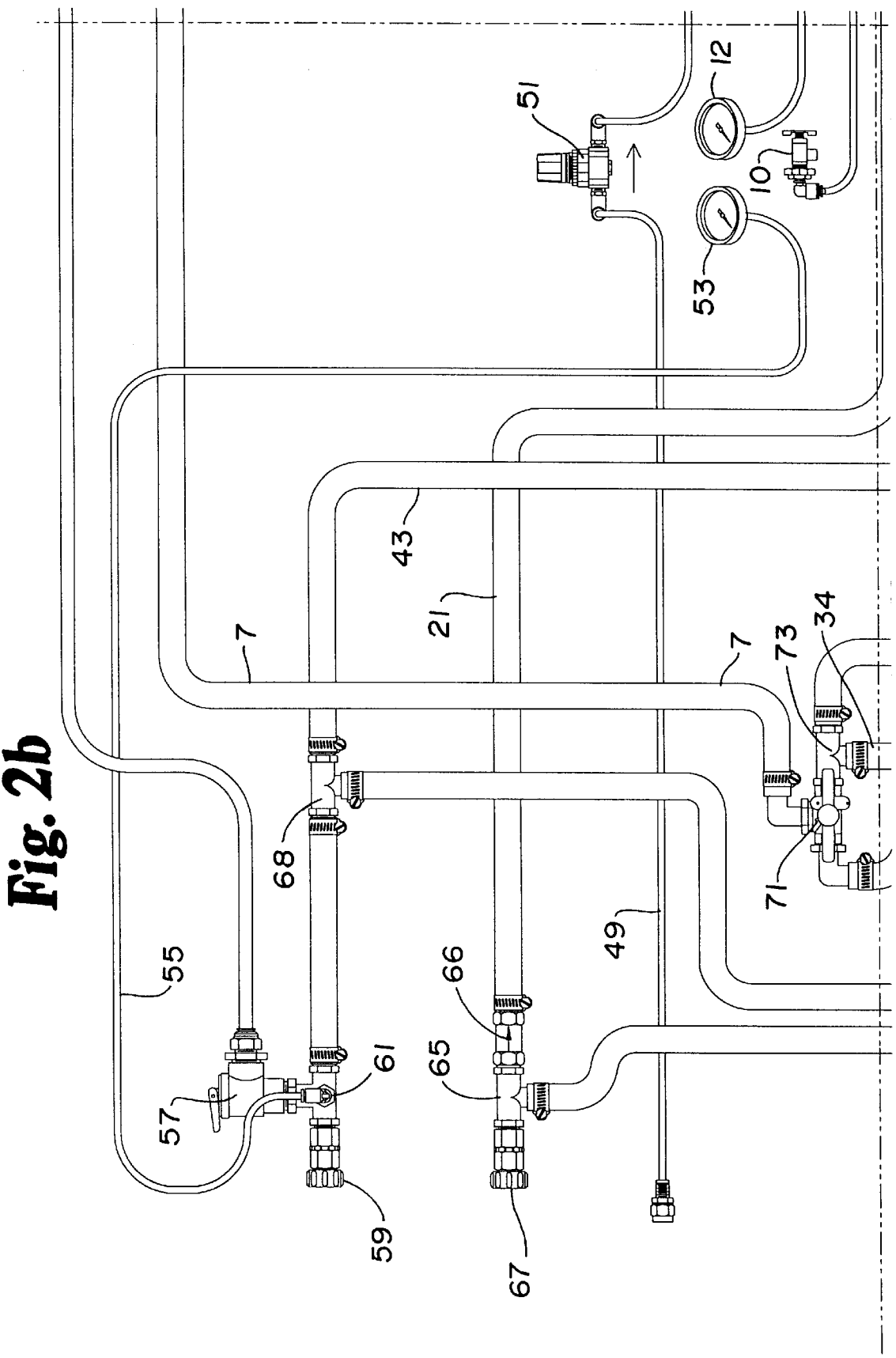

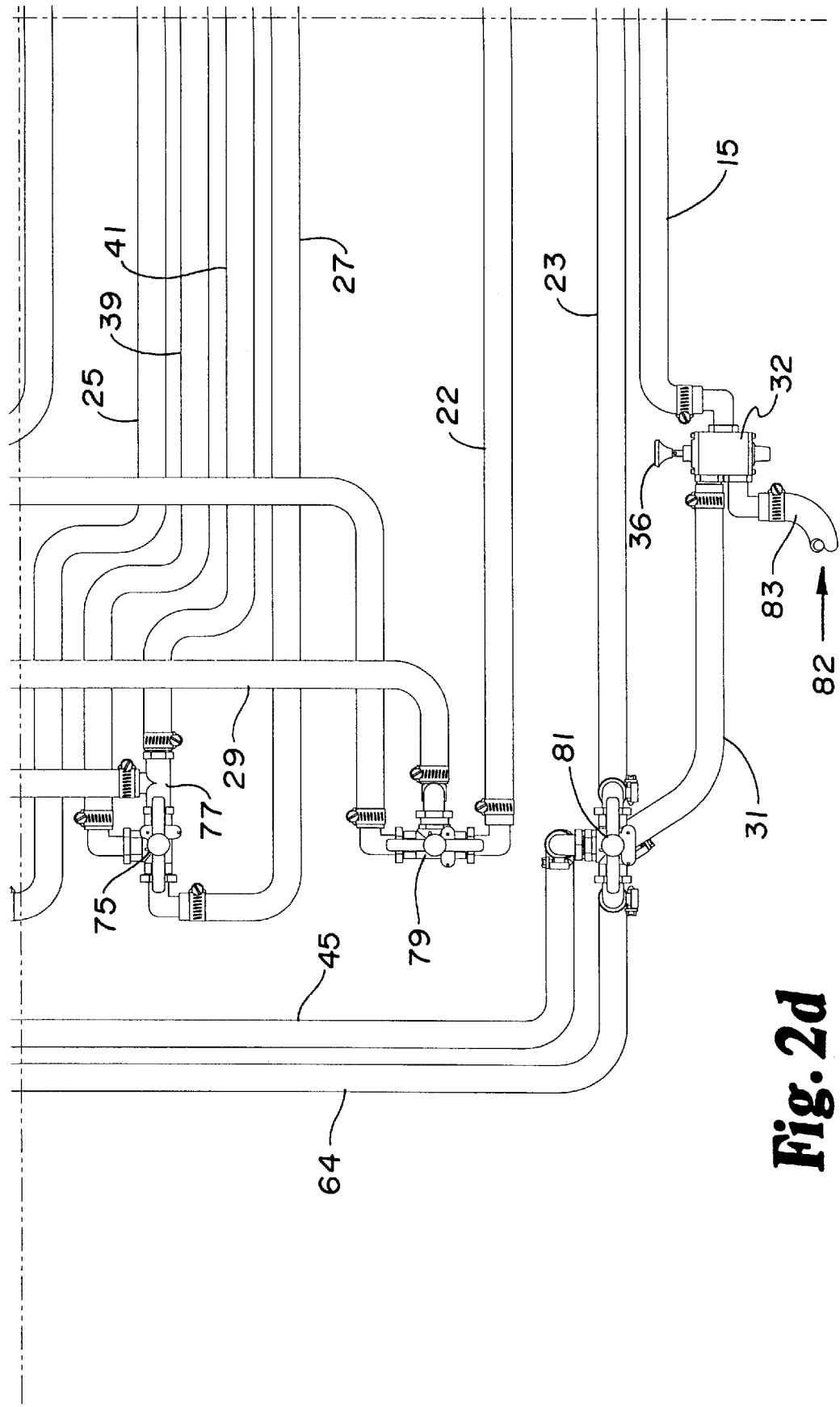

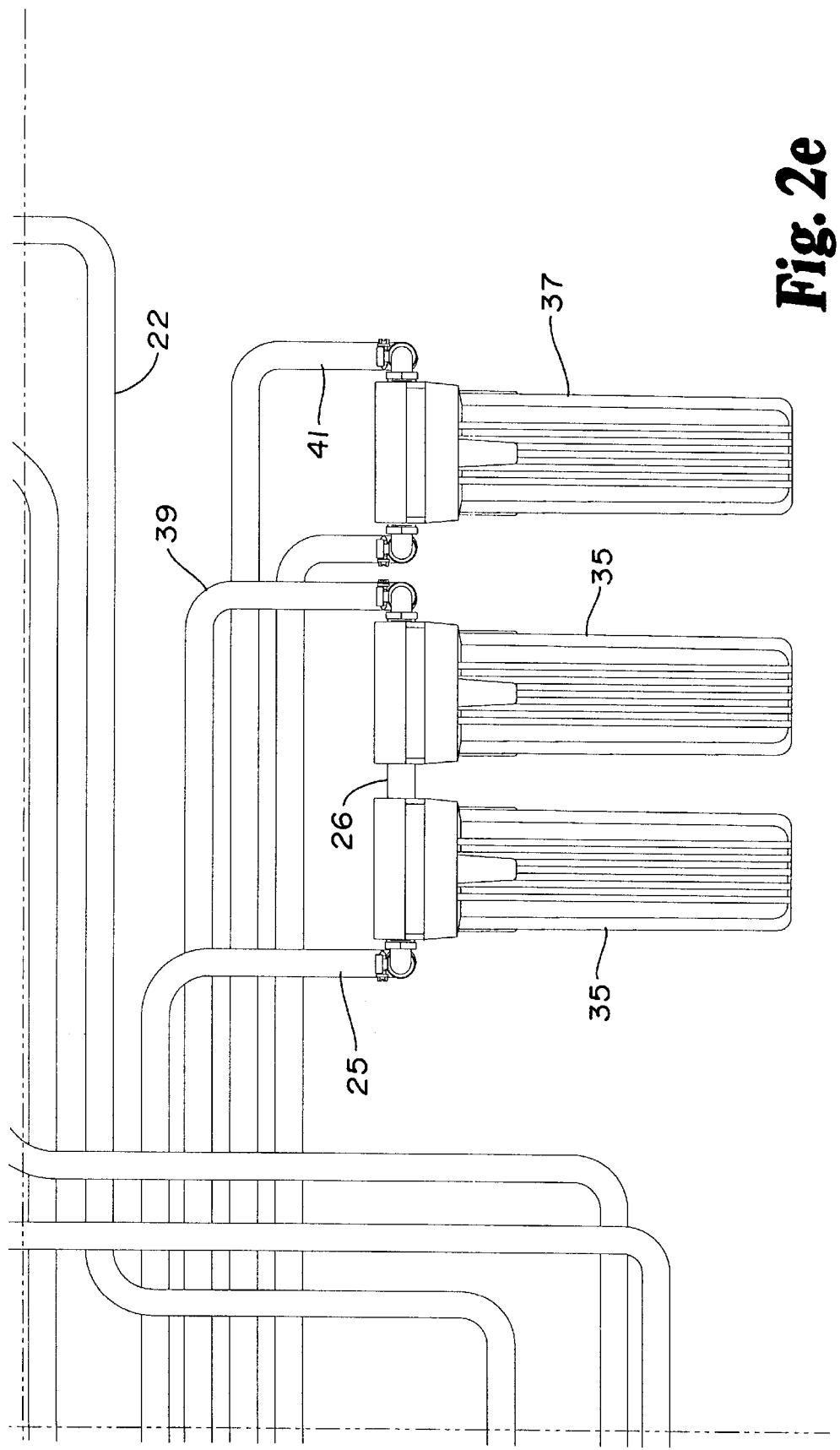

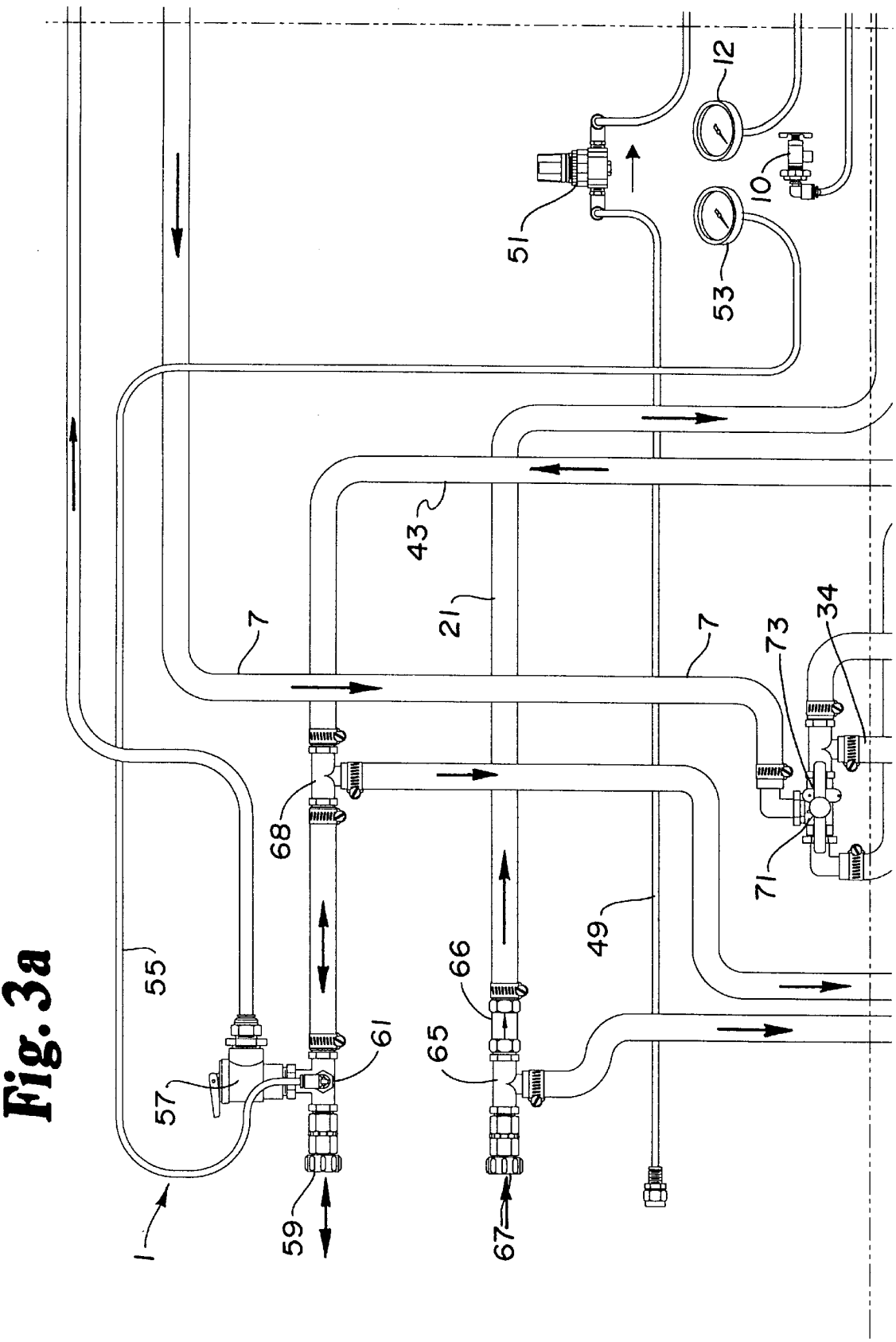

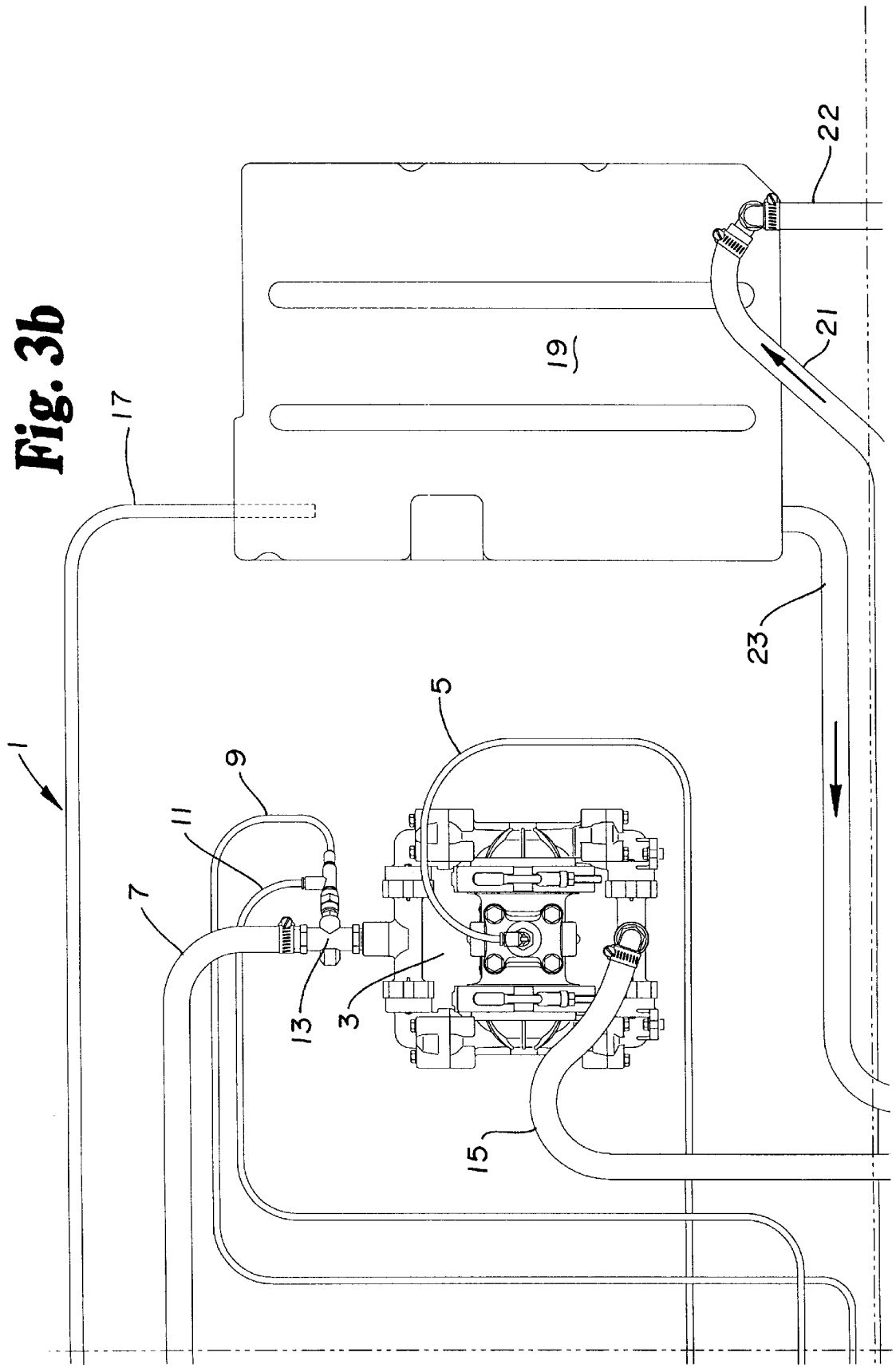

VEHICLE COOLANT RECYCLING

This is application is a division of application Ser. No. 08/362,326, filed Dec. 22, 1994 now U.S. Pat. No. 5,549,832.

BRIEF DESCRIPTION OF THE INVENTION

The invention relates to a process for the treatment and recovery of spent vehicle coolant that involves the following steps:

a) treating spent coolant removed from a vehicle with sodium dimethyldithiocarbamate to convert dispersed metal containing components therein to less dispersed particles;

b) treating the spent coolant of step a) with an aqueous coagulating agent such as a polyquaternary ammonium compound, in an amount sufficient to aggregate the dispersed metal containing particulates to a more filterable form;

c) filtering the spent coolant through two filters, the first being more porous than the second, and d) optionally separating oils, dyes, acidic degradation products, and particulates from the spent coolant by passing the spent coolant through a bed of carbon particles and/or an open-cell foam;

e) adding to the resultant treated spent coolant a combination of corrosion inhibitors, buffering agents and alkali, whereby the treated coolant can be recycled to a vehicle for effective coolant performance therein.

In addition, the invention relates to an apparatus for carrying out this process.

BACKGROUND OF THE INVENTION

The typical internal combustion engine is cooled by providing a coolant (oftentimes called anti-freeze) in cavities that surround the engine. A typical coolant is an aqueous glycol composition such as aqueous ethylene glycol or propylene glycol. These glycols function to reduce the freezing point of coolant and raise the coolant's boiling point, thus assuring that the vehicle's coolant will not freeze or boil over. During operation of the engine, air is constantly drawn into and expelled from the coolant composition. When the coolant is heated during engine operation, air is expelled from the coolant. When the engine is at rest and the temperature of the coolant drops, air is absorbed by the coolant up to the saturation point. This repeated cycle in the life of a coolant provides an oxidation mechanism by which metal ions that are generated by corrosive attack of engine surfaces are subjected to instantaneous oxidation and glycol is thermally oxidized.

Essentially all metal ions when converted to their highest oxidation state form insoluble hydroxides and oxides in the coolant composition, thus forming a precipitate that collects within the engine's coolant chamber. Some of the metals are oxidized to form precipitated hydroxides that deposit on the wall of the coolant chamber and interreact by condensation reactions to form a beneficial oxide layer. This layer protects the engine block from serious corrosion. It would be undesirable to have present in the coolant a component that attacks that beneficial oxide layer and causes its removal. Such action eventually leads to serious corrosion of the engine block. One such component that would attack the beneficial coating if present in the coolant in deleterious amounts, is the chloride ion. It will convert the oxides into soluble chlorides, thus wiping away the beneficial oxide layer. For example, it will convert iron oxides through thermally induced chlorination, to ferric and ferrous chlorides, and aluminum oxides through thermally induced chlorination, to aluminum chloride. These chlorides are very acidic and notorious Friedel-Craft catalysts. They can accelerate the decomposition of the coolant and cause corrosion of metal surfaces.

Other of the precipitates form within the coolant and serve no useful function. Most of these precipitates are of sufficient size so as to deposit from the coolant to the bottom of the coolant chamber. A minor portion, more like a trace amount, of the precipitates have such a small size (more like microscopic in size) that they remain dispersed in the coolant. Eventually these precipitates have to be removed and thus flushing of the coolant system is an appropriate procedure.

The trace amounts of these metal hydroxides that remain suspended particulates within the coolant will, with time, chemically interreact to form dimeric and oligomeric condensates. Such condensates remain suspended (dispersed) in the coolant. These condensates are difficult to remove by filtration because they have an extremely small particle size. Because the metal atoms in these condensates are at their maximum state of oxidation, further oxidation of the coolant will not cause these condensates to be further oxidized. Nor will further oxidation cause these condensates to drop out of dispersion in the coolant.

As noted above, some of the coolant becomes chemically altered. For example, a minor portion of the ethylene glycol is periodically thermally oxidatively attacked to form a number of decomposition products such as glycolic acid, formic acid and oxalic acid. These acids per se do not cause the coolant to become acidic, that is, cause the coolant to have a pH below about 7. As pointed out in an article by Cooper, Hannigan and McCourt, "A One Thousand Car Assessment of the U.S. Car Population Cooling Systems," *SAE Technical Paper Series, Proceedings of the 2nd Automotive Corrosion Prevention Conference, Automotive Corrosion and Prevention Conference,* Dearborn, Mich., Dec. 5–7, 1983, the mean pH of the ethylene glycol coolant in the car population is 8.7, with only 2.3 percent of the cars having coolant with a pH of 7 or less. Since the pH of the coolant is dictated by the buffer system in the coolant, the coolant will generally possess a substantial alkali metal ion content. This causes the acids to compete with the acidic component of the buffer for the alkali metal ions. These decomposition products, as salts and free acids, remain as soluble components of the coolant. Because they are acids, their accumulation in the coolant reduces the coolant's pH. With reduction of pH comes increased corrosion of engine surfaces resulting in increased concentrations of metal hydroxide and oxide precipitates. Eventually, the coolant becomes so fouled by this decomposition that it must be either replaced or reconditioned.

Conley, J. H. and Jamison, R. G., "Reclaiming Used Antifreeze," MERADCOM Report 2168, U.S. Army MERADCOM, Fort Belvoir, Va., March 1976, describe an early effort by the U.S. Army in treating recycled vehicle coolant. As these authors note, coolants are repeatedly subjected to oxygenation. Such oxygenation is the cause for thermal oxidative degradation of the coolant. The authors recommend discarding coolant with a freeze point above 5° F., which means that the coolant is too degraded for further treatment. A coolant with such a high freeze point would have a low pH because of thermal oxidation of the ethylene glycol. The authors proposed two methods. Method I involves 1. Take freeze point of coolant. If above +5° F., discard; do not retain for processing.

2. Place antifreeze drained from vehicles into holding tank.

3. Allow antifreeze to settle for several hours or until fairly clear. The longer the settling time, the more solids will have settled and less will remain to be filtered.

4. Filter through a cloth filter.

5. Pass filtrate through cationic resin (IR-120 or equivalent).

6. Pass effluent through activated carbon.

7. Pass effluent through calcium carbonate (marble).

8. Add inhibitor which involves bringing the antifreeze to its normal range of reserve alkalinity and pH with Federal Specification 0-I-490 corrosion inhibitor. Check freeze point, adding new antifreeze or water to obtain desired freeze point.

9. Flush vehicle cooling system with water and recharge.

Method II proposed by the authors involves

1. Take freeze point of coolant. If above +5° F., discard; do not retain for processing.

2. Drain cooling system, and filter the antifreeze through cotton batting or cloth filter to remove rust and solids.

3. Add Inhibitor A at the rate of 3 percent, or 1 pint per 16 quarts coolant.

4. Flush cooling system with water until the water is clear.

5. Replace the inhibited, used antifreeze solution.

Method I described by Conley and Jamison above, with the exception of the use of cation exchange resin, activated carbon and calcium carbonate, was employed with minor differences by PECO (formerly Philadelphia Electric Co., Philadelphia, Pa.) in 1987 to successfully reclaim antifreeze.

There are described in the literature a variety of systems directed to the treatment of spent engine coolant that allows for the recovery and refurbishing of such coolant. Illustrative of such technology are a series of patents to the Wynn Oil Company, such as U.S. Pat. Nos. 4,083,393, 4,091,865, 4,109,703, 4,178,134, 4,209,063, 4,293,031, 4,791,890, 4,793,403, 4,809,769, 4,899,807, 4,901,786, 5,201,152, 5,078,866, 5,306,430, 5,318,700, and Re.31,274. For example, Filowitz, et al., U.S. Pat. Nos. 5,021,152 and 5,078,866 relate to the treatment of coolant with agents that precipitate anions and cations and the removal of such precipitants. The patents describe the addition of "Composition A" and "Composition B" to the recycled coolant. According to the patents, "A" precipitates anions, i.e., the negatively charged ion, especially the ion that migrates to an anode in electrolysis, such as sulfate, chloride, etc. "B" precipitates cations, such as metal ions—i.e. of lead, iron, copper, etc. According to the patents, Composition A is a material called "Protazyme," which is defined as an 8% aqueous solution of cationic polyelectrolyte HYDROFLOC 865 having the chemical formula

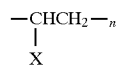

where X is undefined. The patents confuse the description of Composition B. Composition B, called "NETAMOX," is "a 5% aqueous solution of anionic polyelectrolyte, or equivalent, and a 5% aqueous solution of heavy metal precipitant" that appear to be "Sodium dimethyl dithiocarbamate in 0.5% to 1.5% aqueous solution form" and "HYROFLOC 495L" that possesses the chemical formula

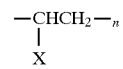

where X is undefined. In chemistry, the "X" group is frequently used to denote halogen.

It should be noted that the formula of HYDROFLOC 865 and 495L is the same for materials possessing entirely different properties. If Composition B is 5% of the anionic polyelectrolyte and 5% of the DTC solution, what is the rest of the composition? That is not explained in the patents.

In both patents, a filtered coolant is treated by the addition of chemical agents such as corrosion inhibitors, pH adjustment chemicals and fresh coolant, such as ethylene glycol or propylene glycol, depending upon the base of the spent coolant being treated.

PCT/US92/00555 and U.S. Pat. No. 4,946,595, to Miller, describe a process for the treatment of a spent coolant outside of the engine. The treatment involves an oxidation step, which, as noted above, will have no impact on the character and properties of the spent coolant. Another step utilized by Miller is the treatment of the spent coolant with an alkali such as sodium hydroxide, to not only raise the pH, but to also form salts of the coolant decomposition products, such as glycolic acid, formic acid and oxalic acid. According to Miller, these salts precipitate from the coolant. Interestingly, Miller also describes adding such salts to the coolant to create a common ion effect. In the latter case, Miller is suggesting that the so-called salts that precipitate are soluble in the coolant, clearly indicating that salt formation does not result in acid removal by precipitation. The next step in the process is to pass the coolant through a series of filters, the first filter effecting a coarse separation, and the second filter effecting a finer separation. An optional treatment is to pass the treated coolant through an ion exchange resin to remove alkaline earth metal ions. However, at the pH of the coolant at that step of the process, all such alkaline earth metal ions are fully oxidized to their hydroxides which are insoluble in the coolant. All but a trace amount of these hydroxides would have already precipitated from the coolant.

The PCT application describes a variety of additive packages for spent coolant. For example, the PCT application (at page 15) describes the use of sodium dimethyldithiocarbamate as part of an inhibitor package in the following terms:

"An additional precipitating agent which may be added to the additive comprises a sodium salt of the class [sic] carbamates to remove dissolved metals from the coolant solution for retention in the filtration means. Preferred sodium carbamates include sodium dimethyl or diethyl dithiocarbamate or sodium trithiocarbamate [sic] present in the additive in an amount of about 0.5%."

At page 20, in Table F of the PCT application, Miller describes a chemical additive package that contains sodium dimethyl or diethyl dithiocarbamate. The following table embellishes on the formulation described in Table F by functionally describing the components where such makes sense to do:

TABLE F—Page 20, PCT/US92/00555

(a) About 2.0 percent sodium nitrate. Known aluminum corrosion inhibitor (b) About 1.5 percent ACCUMER 3000. Rohm & Haas Acrylate copolymer; solids dispersant (c) About 1.5 percent BELCLENE 201. Aqueous solution of poly(maleic acid) [homopolymer of 2-butenedioic acid], now sold by FMC Corporation, Process Additive Division, 1735 Market St., Philadelphia, Pa. 19103

(d) About 1.5 percent sodium molybdate decahydrate. $Na_2MoO_4.2H_2O$—very effective corrosion inhibitor, expensive (e) About 0.75 percent sodium nitrite. Corrosion inhibitor for iron. Not used in passenger vehicles. Can form carcinogenic nitrosamines when mixed with amines. Used in heavy duty coolants for diesel engines with wet sleeve cylinders.

(f) About 2.0 percent sodium tolyltriazole 50% solution. Tolyltriazole, a primary copper and brass corrosion inhibitor

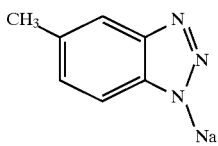

(g) About 0.5 percent dimethyl or diethyl dithiocarbamate. Inhibitor or precipitating agents for metals.

(h) About 1.5 percent sodium hydroxide. NaOH, used to raise pH of coolant.

(i) About 0.1 percent dimethyl silicone. A defoamer; general structure:

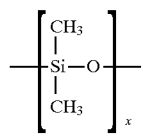

(j) About 0.5 percent polyalkylene glycol. Number of these polymers are used as antifoam, e.g., PPG 2025 and 50HB-5100 sold by Union Carbide Chemicals & Plastics Co., Inc.

(k) About 1.0 percent Philadelphia Quartz N solution. Sodium silicate solution, very effective aluminum corrosion inhibitor.

(l) About 0.5 percent Dow Corning Q1-6083. A silicone phosphonate used to stabilize silicates in concentrated coolant solutions or in the additive package.

(m) About 85.15 percent softened water.

A system that was commercialized in the past was sold by ECP, Inc., Westchester, Ill. It involved the vacuum removal of spent coolant from an engine, subjecting the coolant to filtration, and the addition of a "Coolant System Protector" to the filtered spent coolant.

Woyciesjes et al., U.S. Pat. No. 5,223,144, describe a process for treating an aqueous spent coolant composition by adjusting its pH to the acid range, e.g., 4.0–7.5, by adding an acid, and then adding acid salts to effect precipitation of heavy metal impurities in salt or complex form from the spent coolant. Also included in the process description is the treatment of the acidic coolant composition with coagulating and flocculating agents, filtration of the acidic coolant, passing the acidic coolant through an activated carbon bed, through a distillation step, and a skimming step to remove precipitates.

The Invention

This invention relates to a process and apparatus for the treatment of a spent alkaline and glycol-based coolant removed from an internal combustion engine that avoids the significant introduction of chloride and other acidic anions that can attack metal and metal oxide surfaces in the engine's coolant chamber when the coolant is reintroduced to the engine's coolant chamber. In addition, the process of the invention utilizes systems that actually reduce trace oxidized metal precipitates dispersed in the coolant and oxidative decomposition products of the coolant. The process of this invention accomplishes this without acidifying the coolant.

The invention relates to a process for the treatment and recovery of such spent alkaline and glycol-based coolant that involves the following steps:

a) removing the spent alkaline coolant from the engine;

b) treating the spent alkaline coolant in separate steps with the following treating chemicals:

i) adding sodium dialkyldithiocarbamate—to cause dispersed metal containing components therein to form larger and better definable insoluble particles; and ii) subsequently and separately adding a basic coagulating agent such as a basic polyquaternary ammonium compound to agglomerate the particles into a filterable form;

c) filtering the spent coolant through at least two filters, the first being more porous than the second, to obtain a relatively clear liquid; and d) optionally separating oils, dyes, acidic degradation products, and particulates from the spent coolant by passing the spent coolant through a bed of carbon particles and/or an open-cell foam;

e) adding to the relatively clear liquid a combination of corrosion inhibitors, buffering agents and alkali, whereby the treated coolant has a pH between about 8 and about 11, and can be recycled to the engine for effective coolant performance therein.

The invention relates as well to an apparatus for the treatment of such spent coolant. The apparatus involves a recycler that effects on-car recycling of the spent alkaline coolant or bulk recycling of the spent alkaline coolant. The bulk recycler circulates through a pump, coolant collected from a number of vehicles, into a tank, then through the addition of the chemical treating additives, the filters and carbon bed and back into the tank. Put into the coolant in monitored steps are the treatment chemicals comprising sodium dialkyldithiocarbamate to cause dispersed metal containing components therein to form larger and better definable insoluble particles and a basic coagulating agent such as a basic polyquaternary ammonium compound to agglomerate the particles into a filterable form. This bulk recycling is repeated until the cleanup of the coolant is completed. Aliquot parts of the coolant collected in the tank, after cleanup and chemically refurbished with inhibitor, buffer and pH adjustment, may be used in a vehicle. In the case of on-car recycling, the coolant is circulated through the function of a pump out of the vehicle through a heater Tee, through the filters and carbon bed, then back to the vehicle through a heater hose fitting. In these systems, the chemical treatment and chemical refurbishing of the coolant are effected by independently aspirating the treatment additives and the refurbishing chemicals to the coolant so that the treatment additives and the refurbishing chemicals are essentially uniformly distributed in the coolant undergoing treatment. In both systems, the apparatus of the invention involves a) a pump with a pressure side and a vacuum side, a holding tank, a receptacle for treatment and refurbishing chemicals with a controlled open connection to the vacuum side of the pump, air inlets for the pump, a cannister containing a bed of carbon particle, and one or more cartridge filters, desirably a first filter cartridge for removing coarse particle, and a second filter cartidge for removing finer particulates;

b) in the case of the portable unit, a connecting line from a Tee connector in a heater hose of the cooling system of an internal combustion engine, providing fluid connection to one side of the pump;

c) in the case of the portable unit, a connecting line from the radiator of the cooling system of the internal combustion engine providing fluid connection to the other side of the pump;

d) in the case of both units, linkage of one or more of the connecting lines to the holding tank, and then to one or more sides of the pump;

e) in the case of both units, an aspirating control valve that controls open connection between the receptacle and the vacuum side of the pump;

f) in the case of both units, location of the filter cartridges and carbon bed cannister in indirect connection in series and in fluid connection with one or more sides of the pump whereby fluid can be transported through the cartridges and cannister in a step-wise manner.

In carrying out the process, a first step is to convert the dispersed condensed metal hydroxides into larger and better definable insoluble particles that can be removed from the spent coolant. This is accomplished by treating the spent coolant with sodium dialkyldithiocarbamate, their homologs, and equivalent reducing agents. The alkyl may be lower alkyl, such as alkyl that contain 1 to about 4 carbon atoms. The preferred alkyl is methyl. Sodium dimethyldithiocarbamate is frequently characterized in the literature as "DTC" or "SDDC" (Hawley's Condensed Chemical Dictionary, 12th Edition, Van Nostrand Reinhold Company, New York, N.Y.). The resultant coolant contains additional particulate matter, as well as byproducts of any decomposition of sodium dimethyldithiocarbamate. These particulates and the byproducts should be removed from the coolant before it is recycled. There are three steps in the process that assures removal of particulate matters. The filtration step uses a series of large and small pore diameter filters to remove substantially all of the particulate matter present in the spent coolant. The carbon bed treatment reduces the aforementioned decomposition products, such as the organic acids and SDDC decomposition products.

On treating the spent alkaline coolant with SDDC, the coolant is treated with an aqueous basic coagulant. The coagulant is any material that when added to the spent coolant neutralizes charges of particles in colloidal suspension, and allows these particles to aggregate into filterable particles. The particles in colloidal suspension include insoluble metal containing components and other dispersed materials such as phosphates and sulfates. The coagulant is either soluble or dispersible in water, exhibits a pH greater than 7, and can be added to the spent coolant from an aqueous medium.

The spent coolant flushed from the cooling system contains a variety of different sized particles, especially after treatment with SDDC and the basic coagulant. It has been experienced in treating such spent coolant that a multi-filtering system is preferable. The first step in removing particulate matters is to separate the large particles from the spent coolant. This is accomplished by passing the spent coolant through a coarse filter, that is, a filter with relatively large pores. The resultant spent coolant can then be passed through a fine filter, that is, a filter with relatively small pores, so as to remove the small particulates present in the coolant. This sequential filtering treatment minimizes plugging of the filters and extends the life of the process cycle.

The above process, in attempting to reduce dispersed metal content, introduces a variety of chemical decomposition products to a coolant that is already loaded with oils, dyes and acidic decomposition products of the glycols. It has been determined that a most effective procedure for at least partially removing these contaminants is to pass the spent coolant through a carbon bed. The bed may be made of carbon particles that are either unactivated or activated, with the activated carbon particles being preferred. A particularly preferred embodiment of the invention is the use of monolithic carbon particulate filters in which the carbon particles are interbonded to provide a single porous structure through which the coolant undergoing treatment is passed.

The spent coolant has now been subjected to sufficient removal of dispersed and bulk precipitated metal containing components, as well as the various decomposition products. This replenished coolant does not possess the necessary corrosion inhibitive additives and the appropriate pH for subsequent desired utilization in an internal combustion engine. This is accomplished by adding to the treated coolant the necessary corrosion inhibitors and pH adjustment chemicals.

BRIEF DESCRIPTION OF THE DRAWING

FIG. 1 and 1a–1d illustrate a schematic view of the apparatus of the invention (i.e., the coolant recycler) for carrying out the process of the invention.

FIG. 2 and 2b–2e illustrate a view of the coolant recycler of FIG. 1 and schematically illustrating a separate aspirator receptacle and connection to the vacuum side of the pump.

FIG. 2a is schematic view of an aspirating basin serving as part of the delivery system for treatment chemicals and additives in the coolant recycler for the coolant undergoing treatment.

FIG. 3 and 3a–3d illustrates a variety of fluid flow patterns in the schematic view of FIG. 1 that are used or useful in practicing the method and coolant recycler of the invention.

DETAILED DESCRIPTION OF THE INVENTION

Figures 1, 2, 2A, 3:
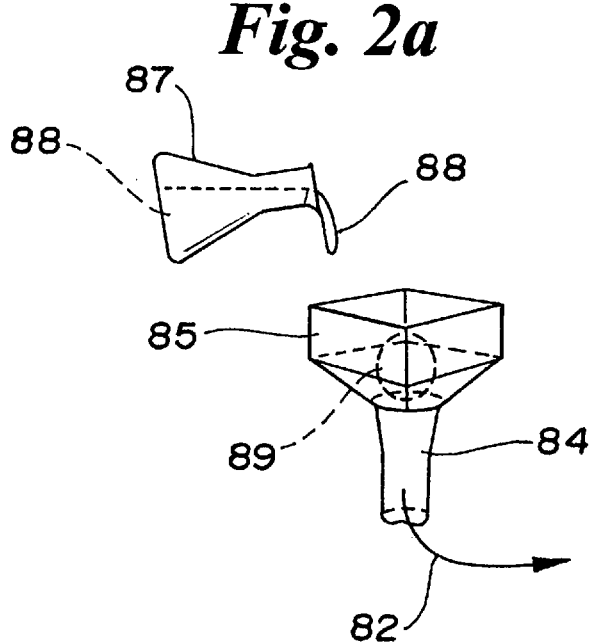
Figure 1A:
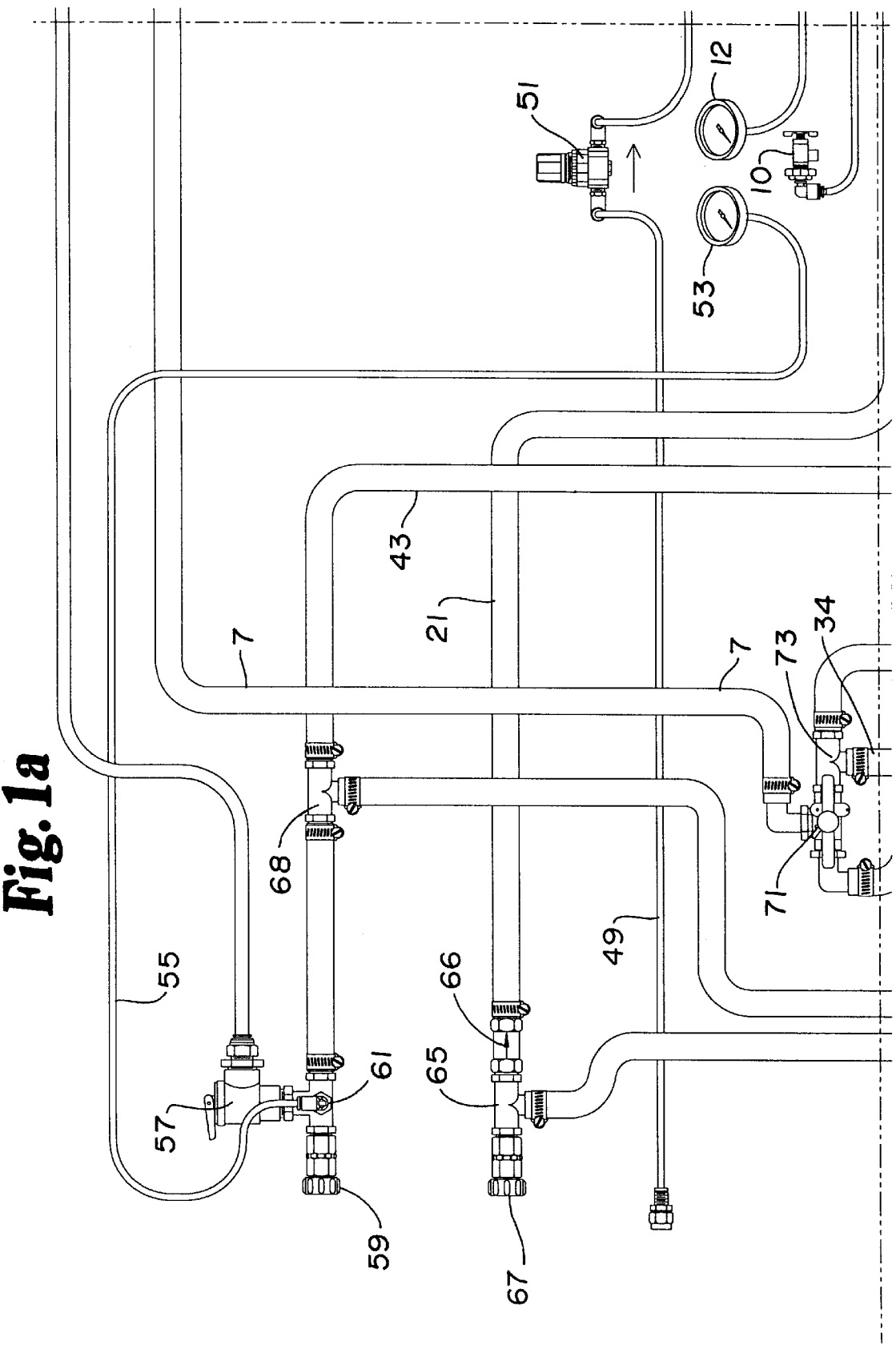
Figure 1C:
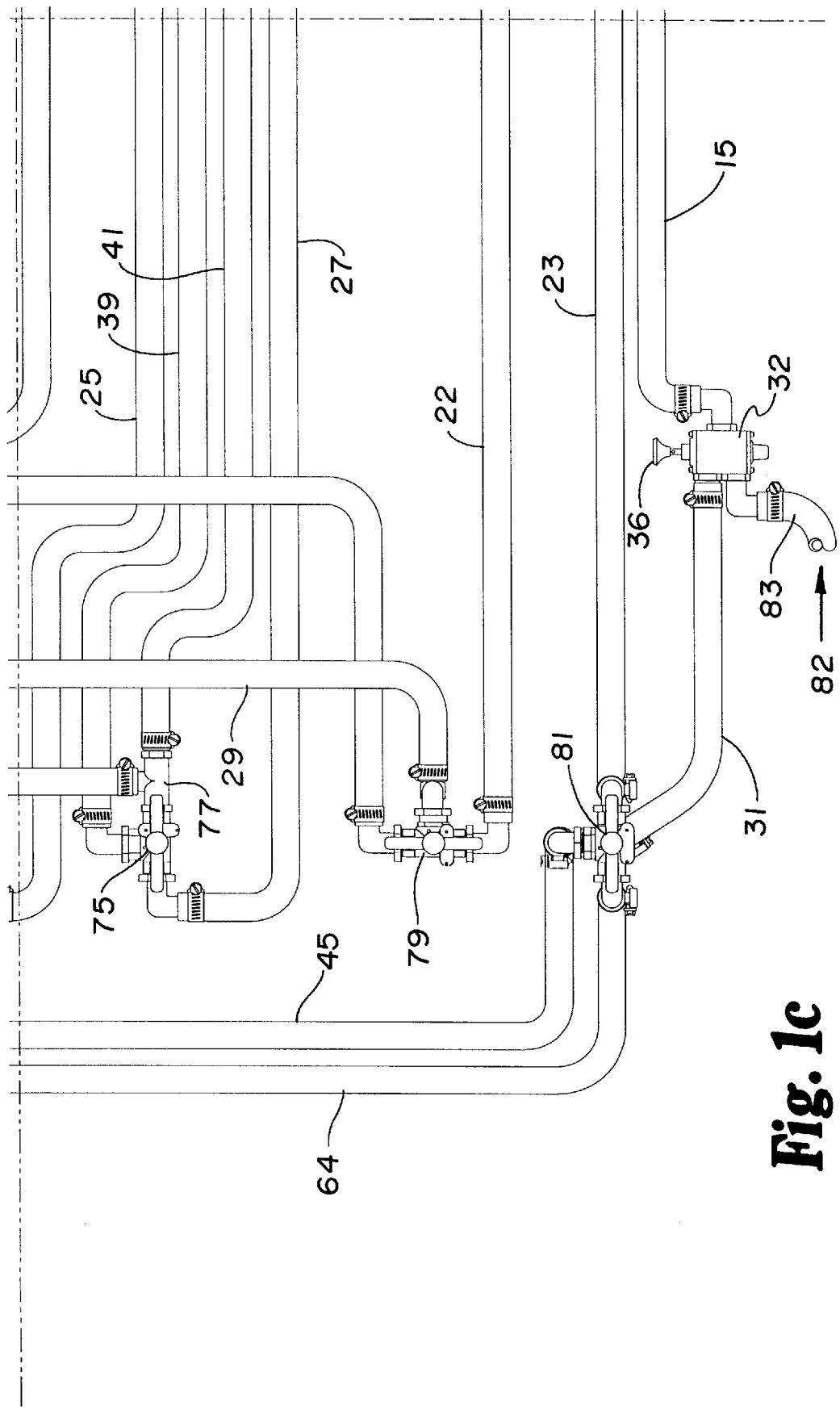
Figure 1D:
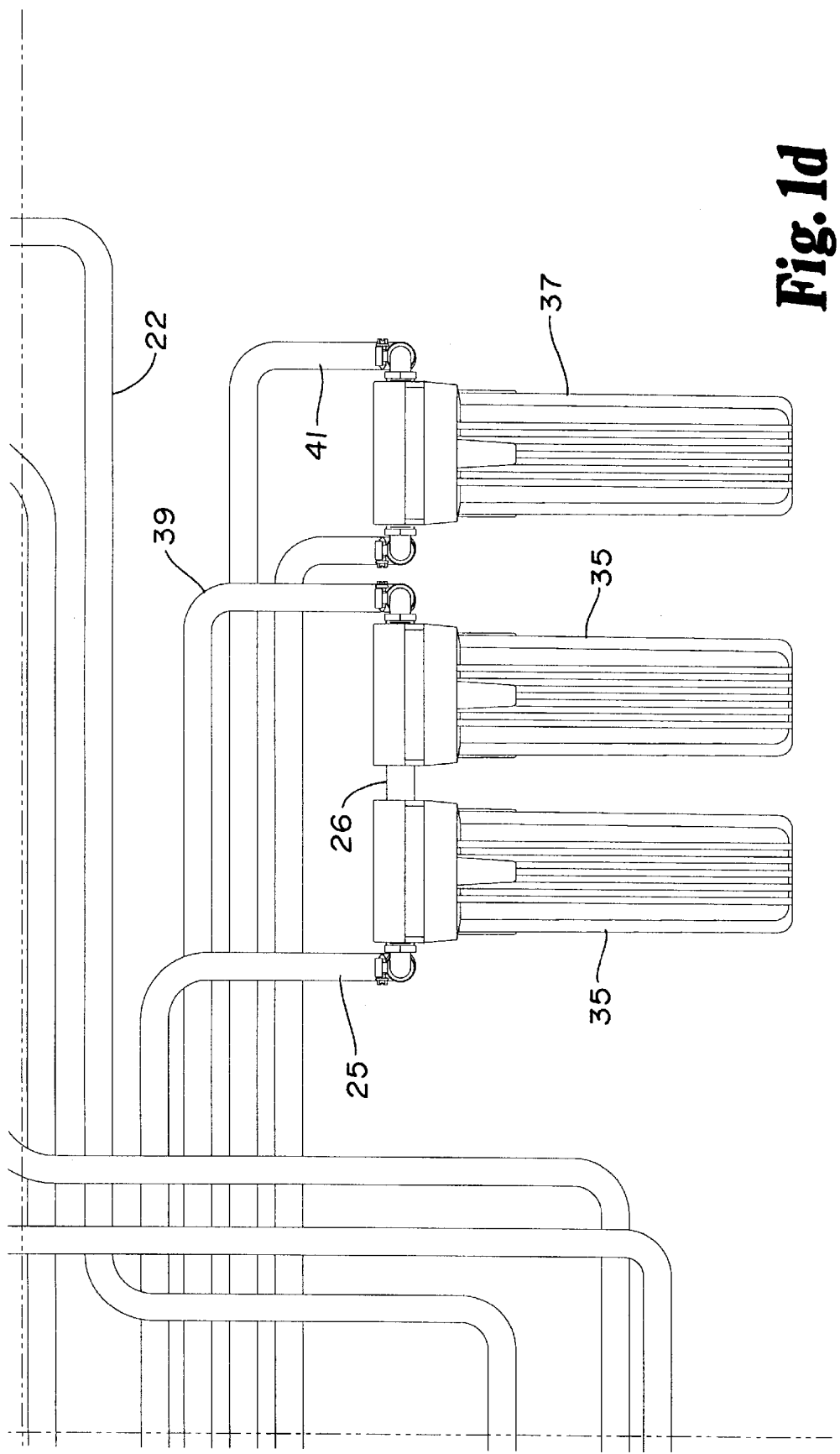
Figure 2C:
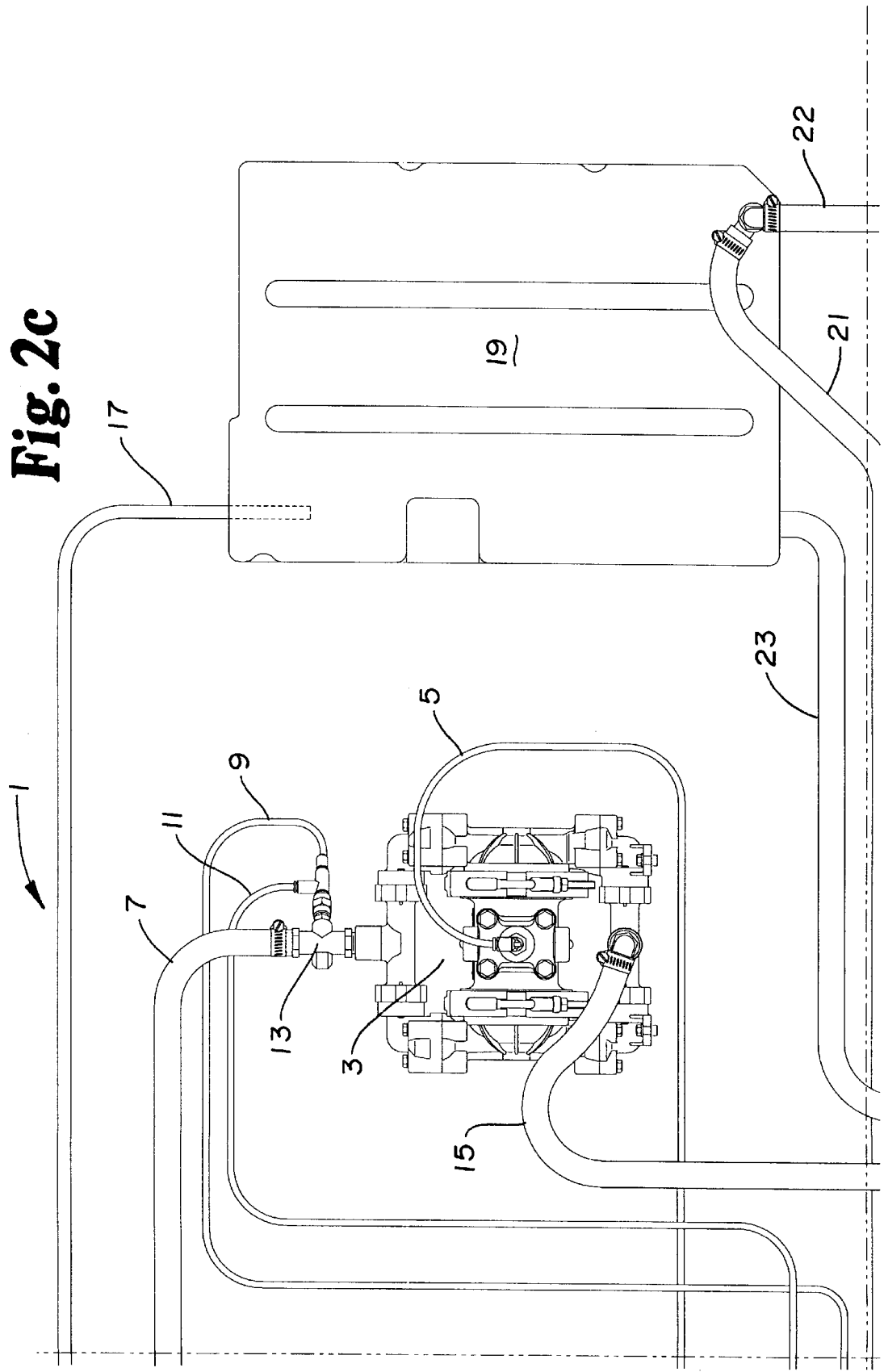
Figure 3C:
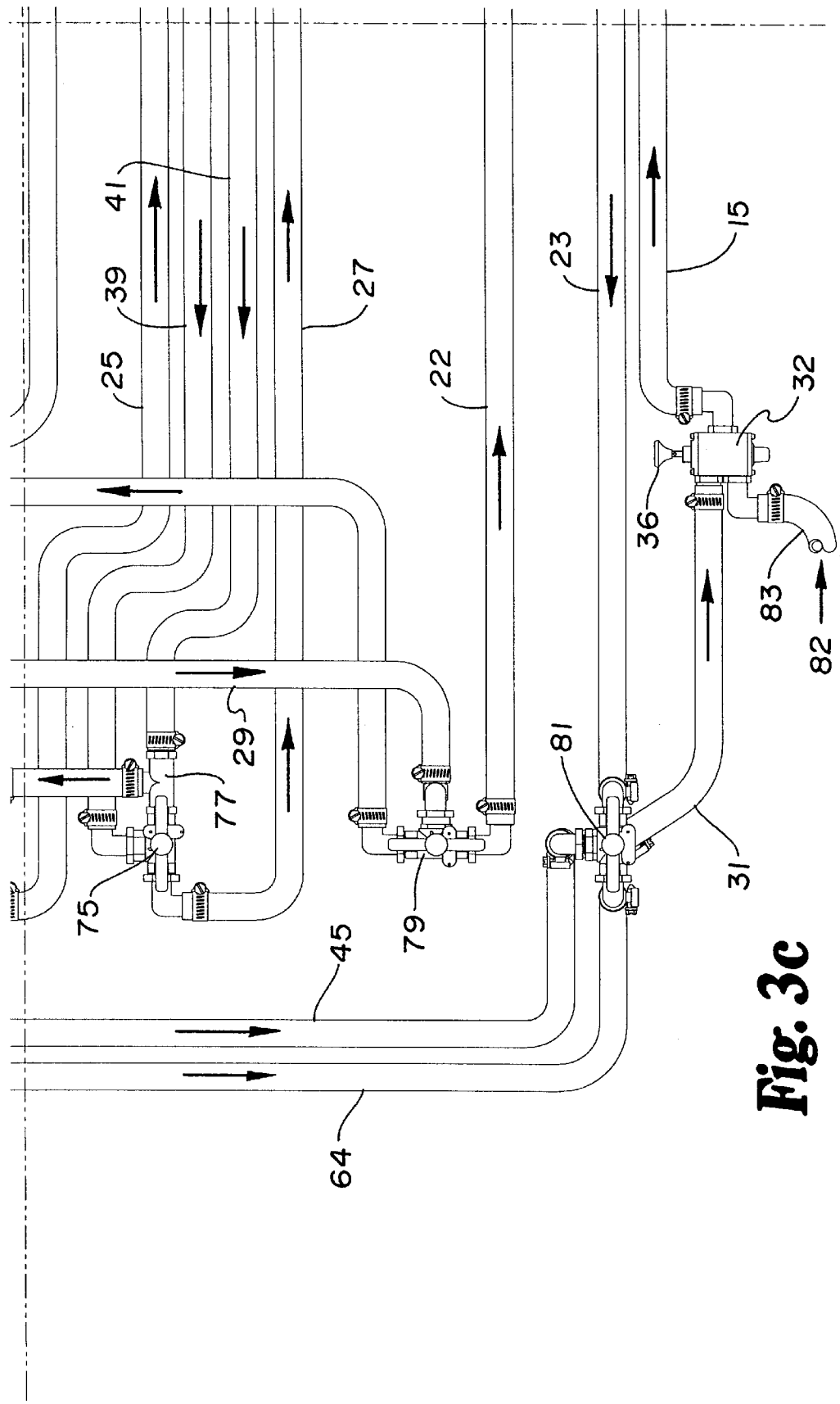
Figure 3D:
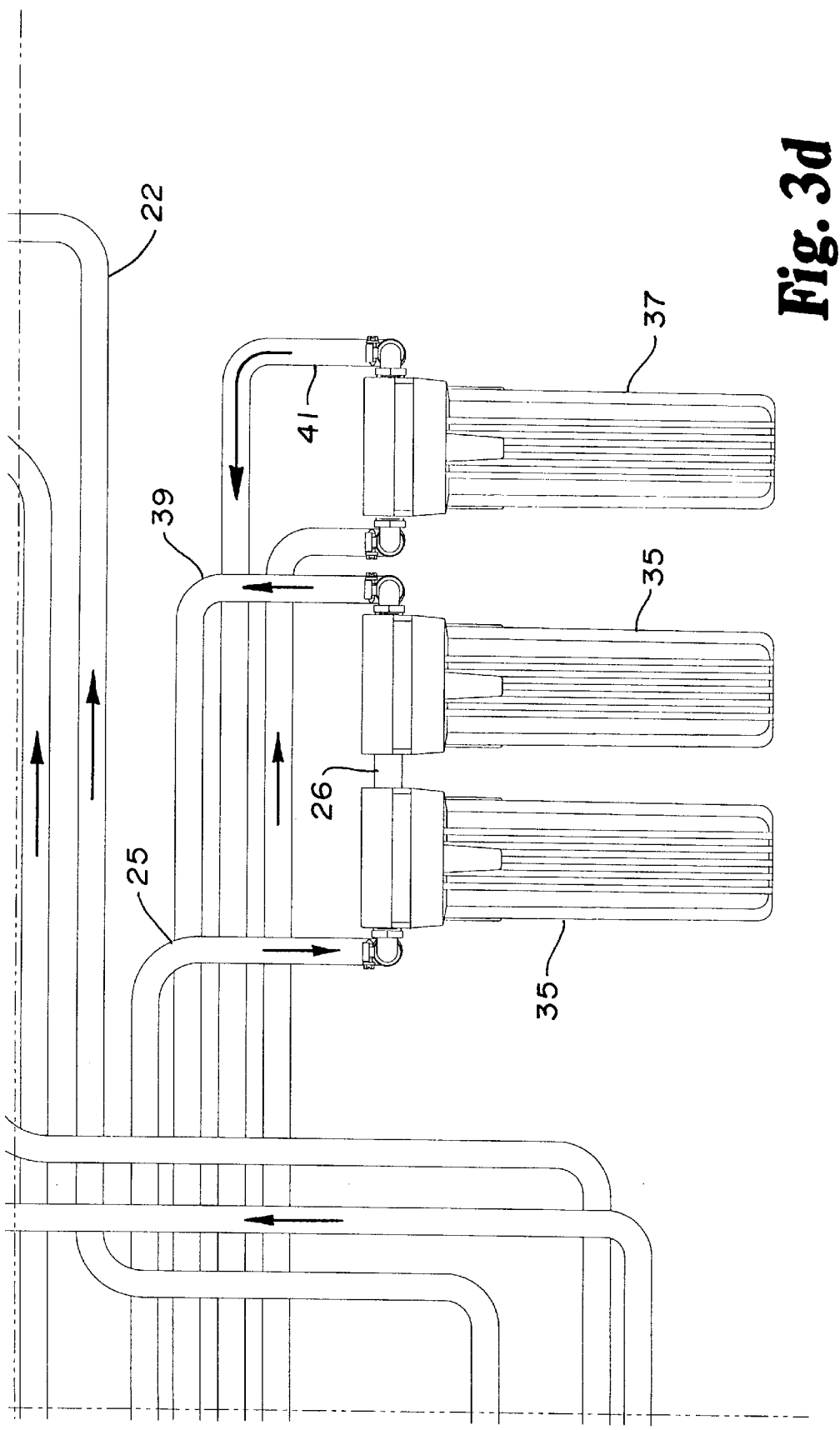

While others have suggested using sodium dimethyldithiocarbamate in spent coolant compositions to precipitate soluble metals, it is a known inhibitor, and therefore, its actual function when added in conjunction with other inhibitors, can relate more to inhibition than oxidized metal complexation that leads to greater precipitation of metal containing components. The small amounts of dispersed oxidized metal present in a spent coolant taken from an internal combustion engine may result from Ostwald's ripening of condensed metal hydroxides along the lines of the following reactions:

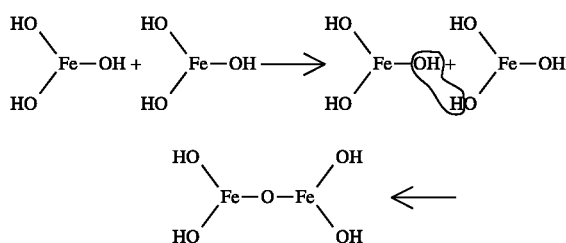

to form colloidal particles, dimeric or oligomeric, that defy separation by conventional filtration. SDDC, which has the formula

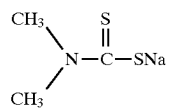

has the capacity of complexing these dispersed particulates into large enough particles that precipitate from the coolant and thus can be filtered by a more porous conventional filter. The size of the particles are still small, and therefore, the particles are removed by a fine filter, and to some extent, in a large filter aided by the presence of larger particulate aggregates. The amount of SDDC, or its equivalent, that is added to the spent coolant undergoing treatment ranges from about 0.01 to about 10 weight percent, basis the weight of the coolant, preferably from about 0.05 to about 7 weigh percent, same basis, and most preferably from about 0.1 to about 5.5 weight percent, same basis.

In a separate step, the spent coolant that has been treated with SDDC is then treated with an aqueous basic coagulant. The coagulant is any material that when added to the spent coolant neutralizes charges of particles in colloidal suspension, and allows these particles to aggregate into filterable particles. The particles in colloidal suspension include insoluble metals and other dispersibles such as phosphates and sulfates. The coagulant is either soluble or dispersible in water, exhibits a pH greater than 7, and can be added to the spent coolant from an aqueous medium.

The preferred coagulant is a basic polymer. In particular, the basic polymer contains quaternary ammonium hydroxide moieties either in the polymer backbone or on groups pendant from the polymer backbone. Where the quaternary ammonium hydroxide moieties are in the backbone, the polymer is a condensation polymer, and when the quaternary ammonium hydroxide moieties are pendant from the backbone, the polymer is an addition polymer. In essentially all cases, the basic polymer is derived from an acidic polymer that is formed by reaction of a monomer that contain a tertiary amine strong acid salt moiety. After formation, the acidic polymer typically exhibits a pH below 4 in aqueous solution. The acid polymer is treated to make it basic. The treatment involves replacing the strong acid moiety with hydroxyl ions. After treatment to replace strong acid ions with hydroxyl ions, the polymer is substantially basic, exhibiting a pH of greater than 7, preferably greater than 8, and typically greater than 9. In the usual case, the polymer's pH is not greater than about 12.

A basic polymer may be a condensation polymer derived from the reaction of ethylene dichloride and ammonia, ethylene dichloride, ammonia, and ethylenediamine and other polyamines. The acidic polymer thus formed is subjected to $^-$OH substituted anion exchange resin treatment or an alkali metal hydroxide (such as sodium hydroxide, potassium hydroxide, lithium hydroxide, rubidium hydroxide and cesium hydroxide) to substitute $^-$OH ions for the choride ions present on the polymer backbone, and form a basic polymer. In the alkali metal hydroxide treatment, the alkali metal chloride can be separated from the polymer by solvent extraction. The condensation polymer is preferably derived by reacting epichlorohydrin (EPI) and dimethylamine (DMA), either in the presence or absence of any crosslinking agents, to form either linear EPI-DMA polymers or to form branched and/or cross-linked EPI/DMA polymers. These branched and cross-linked EPI-DMA polymers may be obtained by reacting epichlorohydrin and dimethylamine in the presence of prescribed amounts of any cross linking agent chosen from the group consisting of ammonia, ethylene diamine, hexamethylenediamine, diethylene triamine, triethylene tetraamine, and mixtures thereof. Subsequent treatment of a ~10 weight % aqueous polymer solution with an $^-$OH substituted anion exchange resin or alkali metal hydroxide, will make the polymer basic. Illustrative $^-$OH substituted ion exchange resins are Amberlyst A27 and Amberlite IRA 402, both sold by Rohm & Haas Company, Philadelphia, Pa.

A preferred basic polymer is a polymer having a weight average molecular weight ranging from about 1,000 to about 50,000 and is a linear EPI-DMA polymer or a mixture of polymers which contains linear polymers of epichlorohydrin and dimethylamine that have been subjected to the aforesaid ion exchange resin or alkali metal hydroxide treatment. These linear EPI-DMA polymers are obtained by reacting epichlorohydrin and DMA in a mole ratio ranging from about 0.95:1.0 to about 1.05:1.0. The polymers may also contain either branched and cross-linked EPI-DMA polymers. The polymers are cross-linked or branched by adding various cross-linking/branching agents such as ammonia, ethylene diamine, hexamethylene diamine, diethylene triamine, triethylene tetraamine, and mixtures thereof, where the cross-linking/branching agent is present from about 0.05 to about 10.0 weight percent of the polymer. Preferably, the cross linking agent is present at from about 0.1 to about 2.0 weight percent of total polymer weight. Again, after formation, the polymer is acidic, typically exhibiting a pH below 4 in aqueous solution. After treatment to replace halogen ions with hydroxyl ions, the polymer is significantly basic, as indicated above.

The preferred polymer is an EPI-DMA polymer which is essentially linear in nature and formed by the reaction of epichlorohydrin and dimethylamine, at the appropriate mole ratios stated above, with the option of a small amount of crosslinking agent such as ethylene diamine. Other suitable condensation polymers are the polymers obtained by reacting essentially molar equivalent amounts of ethylenedichloride and ammonium or ethylenedichloride and ammonia with varying molar amounts of methyl chloride to form a quaternary condensation polymer. The preferred ethylene dichloride ammonia polymer is a polymer that contains ethylene dichloride and ammonia in molar ratios ranging from about 0.95:1 to about 1.05:1 wherein the amine nitrogens in the polymer have been quaternized by reacting with methyl chloride, dimethylsulfate, or other quaternizing agents, such that at least 10 mole percent of the amino nitrogen contained in the condensate polymer backbone has been quaternized. Again the weight average molecular weight for any of these condensation polymers ranges (all molecular weights described herein are weight average molecular weights) between about 2,000 to about 75,000. The preferred molecular weight is from about 2,500 to about 50,000 and the most preferred molecular weight is from 3,000 to about 30,000. Of course, such polymers are subjected to ion exchange resin or alkali metal hydroxide treatment, to render them basic.

Another basic polymer is an addition polymer of diallyl dimethyl ammonium chloride, (hereafter DADMAC) or equivalent salts thereof subsequently treated to convert the polymer to the ⁻OH basic form. This DADMAC containing polymer preferably ranges in average molecular weight between about 50,000 and about 150,000 and contains at least 50 mole percent of the DADMAC monomer, preferably at least 80 mole percent DADMAC, and most preferably the polymer is a homopolymer of DADMAC. These polymers too are subjected to ion exchange resin or alkali metal hydroxide treatment, to render them basic.

Although not as efficient as the condensate polymers, the DADMAC vinylic polymers can also be effectively used in the practice of the invention. These DADMAC polymers preferably contain at least 80 mole percent diallyldimethyl ammonium chloride, or an equivalent salt thereof, and most preferably contain 100 mole percent diallyldimethyl ammonium chloride, that is a homopolymer of DADMAC. Treatment with the ion exchange resin or alkali metal hydroxide, converts the chloride to hydroxide. These homopolymers have a weight average molecular weight ranging from about 25,000 to about 150,000 with the preferred molecular weight ranging from about 50,000 to about 150,000.

Another basic polymer useful in the practice of this invention is a high molecular weight basic emulsion polymer. This polymer generally comprise an acrylamide copolymer produced with a variety of comonomers; e.g., ethylenically unsaturated monomers. The monomers can be either amine containing monomers or quaternary ammonium salt containing monomers as depicted by the following formulas:

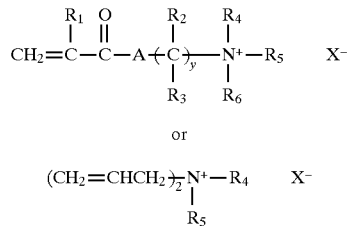

wherein $R_1$ in the above formula represents hydrogen or lower alkyl (e.g., $C_1$–$C_4$); $R_2$ and $R_3$ independently represent hydrogen or hydroxyl; $R_4$, $R_5$, and $R_6$ independently represent lower alkyl (e.g., $C_1$–$C_4$) or benzyl; A represents O or NH, y is 1–5; and X represents chloride or methosulfate. Subsequent treatment of the polymer with ⁻OH substituted anion exchange resin treatment or an alkali metal hydroxide, as aforesaid, converts X to ⁻OH.

Typical of the monomers commonly copolymerized with acrylamide are: the aminoalkylacrylate esters and their quaternary ammonium salts (quaternization with such quaternizing agents as methyl chloride, dimethyl sulfate, benzyl chloride and the like); the aminoalkylmethacrylate esters and their corresponding quaternary ammonium salts; the aminoalkylacrylamides and their corresponding quaternary ammonium salts; the aminoalkylmethacrylamides and their corresponding quaternary ammonium salts; the diallyl-dialkylammonium salt monomers; the vinylbenzyltrialkylammonium salts; and the like. Non-limiting examples of the monomers that can be used to prepare the polymers are: diallyldimethylammonium chloride; diallyldiethylammonium chloride; acryloyloxyethyltrimethylammonium chloride, methacryloyloxyethyltrimethylammonium chloride; acryloyloxyethyltrimethylammonium methosulphate, methacryloyloxyethyltrimethylammonium methosulphate; acryloyloxyethyldiethylmethylammonium chloride; methacryloyloxyethyldiethylmethylammonium chloride; methacryloyloxyethyldiethylmethylammonium chloride; and, methacryloyloxyethyldiethymethhylammonium chloride. Mixtures of the basic monomers together with acrylamide to prepare the polymers are also useful. Also contemplated are homopolymers of the monomers, as well as copolymerization of mixtures of monomers without acrylamide. The above description of useful monomers in no way limits the practice of the invention. Those skilled in the art will be familiar with other monomers which can be used to prepare the basic, high molecular weight polymers useful in the invention. Those skilled in the art will recognize that the acid nature of the resulting polymer will be changed to a basic nature by treatment of the polymer with ⁻OH substituted anion exchange resin treatment or an alkali metal hydroxide, as aforesaid, which converts X groups (e.g., chloride or methosulfate) to ⁻OH.

The basic polymers can have a wide range of charge densities, from just a few mole percent of basic monomer up to 100 mole percent of basic monomer (homopolymers) in which each repeating mer contains a bonded ⁻OH. The molecular weights of the basic polymers are not critical to the invention, but can range from a few thousand to several million.

Preparation of a basic emulsion polymers is well known and is described in the literature in detail. Typical procedures and methods can be found, for example, in reissued U.S. Pat. No. 3,624,019, reissued as Re. 28,474.

Descriptions of suitable polymers that can be converted to basic polymers containing ⁻OH groups, as described herein, can be found in the article on "Polyamines and Polyquaternary Ammonium Salts", in the Encyclopedia of Polymer Science and Engineering, Second Edition, John Wiley & Sons, New York, Volume 11, pages 489–507. It is to be understood that the invention is in no way limited to the above descriptions of basic polymers. Those skilled in the art will recognize other basic polymers that will be useful in the practice of this invention. Mixtures of basic aqueous polymers are also contemplated by this invention.

Illustrative of desirable polymers, which after hydroxylization are converted to basic polymers, are the following:

1. Commercial basic copolymer of acrylamide and acryloyloxyethyldiethylmethylammonium chloride, containing about 8 mole % of the basic monomer, having a molecular weight in excess of one million.

2. Commercial basic copolymer of acrylamide and acryloyloxyethyldiethylmethylammonium chloride, containing about 40 mole % of the basic monomer, having a molecular weight in excess of one million.

3. Commercial basic copolymer of acrylamide and methacryloyloxyethyldiethylmethylammonium chloride, containing about 7.5 mole % of the basic monomer, having a molecular weight in excess of one million.

4. Commercial basic copolymer of dimethylamine and epichlorohydrin, having a molecular weight of about 10,000, in 40% aqueous solution.

5. Commercial basic diallyldimethylammoniun chloride polymer, having a molecular weight of about 500,000, in 18% aqueous solution.

Conversion of acid substituted amine polymer can be carried out by mixing particles of the ion exchange resin, such as Amberlyst A27 and Amberlite IRA 402, with the acid substituted amine polymer, in an amount sufficient to essentially remove all of the acid moieties from the polymer. Preferably, the amount of ion exchange resin is sufficient to convert an otherwise acidic polymer to a basic polymer that exhibits an alkaline pH in water, as aforesaid. A preferred procedure involves flowing an aqueous solution or dispersion of the acidic polymer through a bed of the ion exchange resin, and repeating the procedure, if necessary, until the polymer exhibits the desired degree of basicity. Conversion of the acidic polymer with alkali metal hydroxide can be carried out in an aqueous medium, including the presence of an organic solvent to assure dissolution of the polymer, using at least a stoichiometric amount of the alkali metal hydroxide to the amount of acidic moities present in the polymer. The alkali metal salts can be removed from admixture with the ⁻OH containing quaternary ammonium polymer by extraction using a mixture of solvents possessing different degrees of solubility for the salt and the ⁻OH containing polymer. The degree of conversion of these acidic groups to ⁻OH can be measured by the basicity of the resultant polymer.

The amount of basic polymer used in the practice of the process of the invention is not narrowly critical and is typically dependent upon the amount of solids generated by the treatment of the spent coolant with SDDC or its equivalent. The higher the solids content of the spent coolant that is generated by SDDC, or its equivalent, the greater will be the amount of basic polymer employed. In general, the amount of basic polymer that is employed will range from about 0.01 to about 10 weight percent of the weight of the spent coolant, preferably from about 0.05 to about 8 weight percent, same basis, and most preferably, form about 1 to about 6 weight percent, same basis.

The basic polymer and SDDC may be combined and added together, in order to treat the spent coolant, as stated above. However, it is preferred to separately treat the spent coolant with SDDC and the basic polymer to minimize premature reaction between SDDC and the basic polymer.

The next step in the process is the treatment of the spent alkaline coolant by passing it through the filters or a fixed bed of particulate carbon particles. Preferably, the carbon particles are made of activated carbon. The fixed bed of carbon particles is assembled in a canister or cartridge form to allow its convenient arrangement in the apparatus. The carbon particles may be held together by a netting material such as one made of nylon, polypropylene, polyester, and the like materials. The netting materials may be woven, knitted or nonwoven (e.g., spunbonded) fabric constructions. An advantage of the netting is that it can perform pre-filtration of the coolant being passed through the carbon bed. Where the netting material effects such a result is when the pores of the netting are sufficiently small enough to block particulates in the coolant from passing through the netting into the bed. Preferably, such nettings have a pore size of about 1 to 100 microns, preferably from about 5 to about 50 microns. A particularly desirable netting is a spunbonded polypropylene fabric, in which the fibers deposited in the fabric have a randon laydown and are either fused together and/or adhesively bonded. Such fabrics are commercially available from a number of sources. One may also hold the carbon particles by partially encapsulating them with a thermosetting resin material such as an epoxy, phenol formaldehyde, polyamide, polyesters, and the like type resins or a thermoplastic resin such as adhesive forms of polyvinyl acetate, polyethylene vinylacetate copolymers, nylons, linear polyesters, polyarylethers, polyethersufones, polysulfones, polyarylimides, polystyrene, polymaleic acid, polyacrylates, polyacrylic acids, polymethacrylic acids, and copolymers of the foregoing. The partially encapsulation of the particles is a desirable method for making monolithic bonded carbon particulate beds. In the case of partially encapsulated particles and particles held together by netting, the bed of carbon particles are shaped so that they conveniently fit within a canister or cartridge housing, typically a cylindrical one. Many different bed arrangements are feasible in carrying out the process. The bed arrangement may simply occupy a section of the canister or cartridge housing and the spent coolant passes directly through it to an exit in the housing. The bed may be designed to be shaped as a cylinder with a core opening in the central axis of the cylinder. In that case, the spent coolant will flow in a radial manner from the outside through the cylindrical bed and be captured within the open core of the bed and allowed to flow to an opening in the housing. The preferred flow is radially into the center hollow core of the bed, however the radial flow may be reversed from the open internal core of the bed to the outside circumference of the bed. The purpose of this step is to reduce the presence of oils that coolants typically pick up during an internal combustion engine's operation, reduce the variety of byproduct organics that the recycled coolant contains, and reduce the amount of organic acids present in the spent coolant. The carbon bed removes combinations of organic acids, some of the coagulant and some oil present in the coolant by adsorption. It also removes some of the dye in the coolant.

Activated carbon is an amorphous form of carbon characterized by high adsorptivity for many gases, vapors, and colloidal solids. The carbon is obtained by the destructive distillation of wood, nut shells, animal bones, or other carbonaceous material. It is "activated" by heating to 800–900° C. with steam or carbon dioxide, which results in a porous internal structure (honeycomb-like). The internal surface area of activated carbon averages approximately 10,000 square feet per gram.

The amounts of these impurities that are removed from the spent coolant is dependent upon the residence time of the spent coolant in the fixed carbon bed. If maximum removal is desired, then, of course, an extended residence time in the carbon bed is necessary. The residence time can be controlled by the rate of flow of the spent coolant through the carbon bed, or the number of passes that the same spent coolant makes through a carbon bed, or by increasing the number of carbon beds in order to assure maximum residence time. When the concentration of impurities that can be removed by the bed is not reduced to a desired level at a fixed and standard rate of flow of the spent coolant in the bed, then it becomes apparent that the bed should be replenished by a new bed of carbon particles. Turnover of carbon particle beds is dependent upon the processing objectives of the process user.

A particularly preferred form of the carbon particulate bed is the monolithic bonded carbon particulate bed. A form of such type of bed in an extruded activated carbon filter. They typically comprise virgin activated carbon powder, a thermoplastic binder and, optionally, specialty adsorbents such as zeolites or oxidizing filtration media, manufactured as continuous lengths of rod, tube, sheet, slab, or as other complex shapes. The resulting products are highly porous and extremely uniform, providing high-performance adsorption and particulate reduction at low flow resistance when fabricated into finished filter elements. Extruded activated carbon filters are manufactured as thick-walled, hollow cylinders in a variety of different outside and inside diameters and in lengths from 0.100 (wafer) to 60 inches. The filters can incorporate a wide variety of prefiltration structures and end cappings. These filters are typically fitted with a protective prefiltration medium and encapsulated around their edge using a self-gasketlng structural foam frame.

Generally, an extrusion can be produced using carbon powder, granules or pellets, with particle sizes ranging from about 10 to 5,000 µm. Specialized adsorbent additives can be coated onto the individual carbon particles and then extruded to produce complex composites with unique adsorptive properties. Performance advantages for these extruded activated carbon filters include:

They minimize the release activated carbon particles during startup or operation as compared to some granule activated carbon filter (not of the extruded type), in which the granules are unbonded, that will release carbon fines even after the filter elements have been in service for an extended period of time.

They do not channel, bypass, or fluidize because extruded carbon is a rigid structure that prevents movement of the adsorbent particles or formation of channels and defects in the adsorbent structure. On the other hand, granulated activated carbon filters consist of loose beds of particles that are often loosely packed into a nonrigid plastic tube; therefore, bypass of the carbon is common because the plastic container often expands away from the carbon when under pressure, leaving a sorbent-free zone. Under sufficient flow, the entire bed will fruidize and the integrity of the adsorbent bed can be lost This necessitates careful use of such granulated activated carbon filters.

Coolant flows through these extruded filters in the radial direction (from the outside of the filter element to the inside). As a result, the entire exterior surface of the filter is presented to the incoming coolant fluid, not just one edge of the filter, as in most granulated activated carbon filters.

A particularly preferred extruded filter material is made by KX Industries, L.P., Orange, Conn., U.S.A. Their extruded activated carbon filter material contains one or more layers of melt-blown and spunbonded polypropylene filter media to achieve a "graded pore density" exterior surface. Such filter media in addition to the extruded filter material provides maximum filtration while achieving the adsorptive advantages of a particulate activated carbon filter. The outer filter component may filter particles from greater than 50 to about 5 microns in size.

An alternative to the use of carbon beds, one may employ a foam filter in the system for treatment of the recycled coolant. Such filters may be used to capture particulates and absorb liquid impurities, such as oil, dyes, decomposition products, and the like. A desirable foam filter is a macroreticulated foam in which the pore size is about 1 to 50 microns. Desirable foam materials are comprised of thermoset resins such as polyurethane open cell foams and phenol-formaldehyde open cell foams.

After or prior to the carbon bed treatment, the spent coolant is subjected to filtration. The purpose of putting the filtration after carbon bed treatment is to use the filtration step to remove particles of carbon that get caught up in the coolant during carbon bed treatment. If that is not a problem, then carbon bed treatment may be carried out subsequent to one or more of the filtration steps. For example, the carbon bed can be placed in series with the filters, such as before the first filter or after the first filter, but before a second filter. In this manner, coarse particles can be removed before the coolant is passed to the carbon bed. This reduces the chances of rapid blockage of the carbon bed by large particulates. However, the carbon bed can be placed in series after the filters. If the carbon bed is made monolithic, as describe above, insofar that the particles of carbon are lightly interbonded by a resin without eliminating porosity of the bed to flow of coolant therethrough, then the carbon bed is preferably placed after the filters. In this case, the monolithic carbon particle bed serves as an effective filter of the coolant, considerable enhancing the ultimate clarity of the processed recycled coolant.

In describing this invention, mention is made of steps of the process and features of the apparatus being in series. In doing this, it is not necessary that such steps or features immediately follow each other. As long as the same fluid stream flows through the steps or features in a regular cycle of the process, then those steps and features are considered to be in series. However, if the fluid stream does not flow through the steps or features in a regular cycle of the process, then those steps and features are not considered to be in series.

Filtration, as noted previously, is carried out in two or more steps. This is accomplished by placing filters in series in the apparatus such that the spent coolant is passed in series through one filter and subsequently, any other filter. When a monolithic extruded activated carbon filter is employed, a significant amount of filtration is effected by that filter. As noted above, intervening steps in the process may be provided between the filters.

The filtration capabilities of these filters are based upon pore openings which have a specific diameter. Filters having pore diameters of 25 microns or more are considered, for the purposes of the invention, to be coarse filters and filters having pore diameters of less than 25 microns are considered, for the purposes of the invention, to be fine filters. Coarse filters may range in pore diameters from 25 microns to about 200 microns, and fine filters may range in pore diameters from 0.1 micron up to 25 microns. It is desirable that the first filter make a coarse separation. Typically, the first filter has about 50 micron pores. It is sometimes desirable to utilize a number of coarse filters in series, followed by one or more fine filters in series. For example, a first filter with pores of 75 microns or less, followed by another coarse filter with pores of 50 microns or less, subsequently followed by a third filter with pores of 5 microns or less may prove to be a suitable filter combination. Desirable results have been obtained using a filter sequence in which the first filter has 50 micron pores or less, followed by a fine filter that has 5 micron pores or less.

The filters suitable for this separation are typically conventionally available cartridge-type filters. The filters may be made of a number of materials such as rayon, rayon acetate, rayon triacetate, nylon, polyester, polypropylene, glass fiber, ceramic or metal frits, and the like. The filters may be made of an assemblage of fibers, superimposed fabric constructions, metal or ceramic frits, and the like materials. The fabric constructions can be woven, knitted or non-woven, depending on preference. The filters may be corrugated to increase surface area and resin impregnation of the filter may be used to impart strength.

In specific terms, one embodiment of the process of the invention for off-car coolant recycle is characterized as follows:

1. Cool the internal combustion engine and coolant therein.
2. Install a flushing Tee in the heater hose of the engine.
3. Pressure test the vehicle cooling system and the connected recycling apparatus for leaks.
4. Evacuate the coolant overflow reservoir of the engine.
5. Install cross flow radiator adapter in the upper radiator hose or replace the radiator cap with a vertical flow adaptor.
6. Pinch clamp the heater outlet hose between the heater hose Tee and the water pump.
7. Recirculating coolant in the engine by pumping coolant from the tank in the recycler into the heater hose Tee to backflush coolant to the recycler tank. This is done for about 5 minutes, bypass filtration.

8. Remove circulation of coolant from the recycler's tank so that the flow from the engine is on the vacuum side of the pump of the recycler. This creates a closed loop system that includes the cooling system of the engine.

9. Aspirate SDDS into the coolant, using about 1 oz. to 1 gallon of coolant, corresponding to about 2–4 weight percent of SDDS basis weight of the coolant, to convert dissolved metal components into very small particles as noted above.

10. Then aspirate the basic coagulant into the coolant. Continue to circulate for about 5 minutes to allow essentially complete mixing of the aspirated chemicals into the coolant.

11. Route the coolant through fifty and five micron filters and circulate for about 15 minutes cycle time depending on the condition of the coolant.

12. A sample is taken from the sample spigot just before engaging the carbon filter. This sample serves as a "before carbon filtration" case.

13. Route coolant through a monolithic carbon bed filter for removing oils, fine particles, excess coagulant, other organics, and circulate the fluid for about 10 minutes. The sample should be essentially transparent at this time.

14. Another sample is taken from the sample spigot. This sample is compared to the sample taken in above item 13 to see if there is any change in color. If there is no color change or lightening in the shade of the coolant, the carbon filter may be spent. At this time the coolant should be transparent. Take the carbon bed and the filters out of the loop before adding inhibitor.

15. Add inhibitor package to the coolant. Circulate the coolant for about 5 minutes.

16. Check freezing point of coolant, adjust freeze point appropriately by adding fresh coolant through the chemical addition basin and aspirate into the coolant. Continue addition until the desired freezing point is reached. If freezing point is above −34° F., the freezing point should be lowered to −34° F. or less, as desired.

17. Turn off the recycler.

18. Crossflow adapter applications (FIGS. 1–4 reference)
   a) With the machine off, close the valve on the hose connected to the radiator adapter.
   b) Set valves 71 and 75 to bypass and valves 79 and 81 to drain. Check that the cooling system pressure is zero then remove the radiator cap.
   c) Slowly turn on the pump speed regulator and evacuate the coolant in the radiator to below the level of the upper radiator hose.
   d) Remove the crossflow adapter and reinstall the upper radiator hose.
   e) Set valves 71 and 75 to bypass and valves 79 and 81 to vehicle recycle. Slowly turn on the pump speed regulator and open the valve on the "to radiator" hose. Add enough coolant to cover the fins in the radiator. Turn off the pump speed regulator.
   f) Install the radiator cap.
   g) Disconnect from the heater hose tee.
   h) Set valves 71 and 75 to bypass and valves 79 and 81 to vehicle recycle. Place the hose end previously connected to the heater hose tee into the overflow reservoir opening and open the hose valve.
   i) Slowly turn on the pump speed regulator and fill the overflow reservoir to ¾ full. Larger vehicles may require new or recycled antifreeze to be added to the overflow reservoir.
   j) Turn off the pump speed regulator and cap the overflow reservoir.

19. Start Engine, run with heater on about 5 minutes, then shutdown.

20. Vertical flow adapter applications (FIGS. 1–4 reference)
   a) With the machine off, close the valve on the hose connected to the radiator adapter. Remove the adapter, the coolant level should be to the top of the radiator, and install the radiator cap.
   b) Disconnect the hose attached to the heater hose tee.
   c) Turn valves 71 and 75 to bypass, valves 79 and 81 to vehicle recycle, and open the valve at the end of the "to radiator" hose. Then, using the hose just disconnected from the heater hose tee, slowly add recycled coolant to the overflow tank until it is ¾ full. Larger cooling systems may require additional new or recycled antifreeze to be added to the overflow reservoir.

21. Start Engine, run with heater on about 5 minutes, then shutdown.

Figure 4:
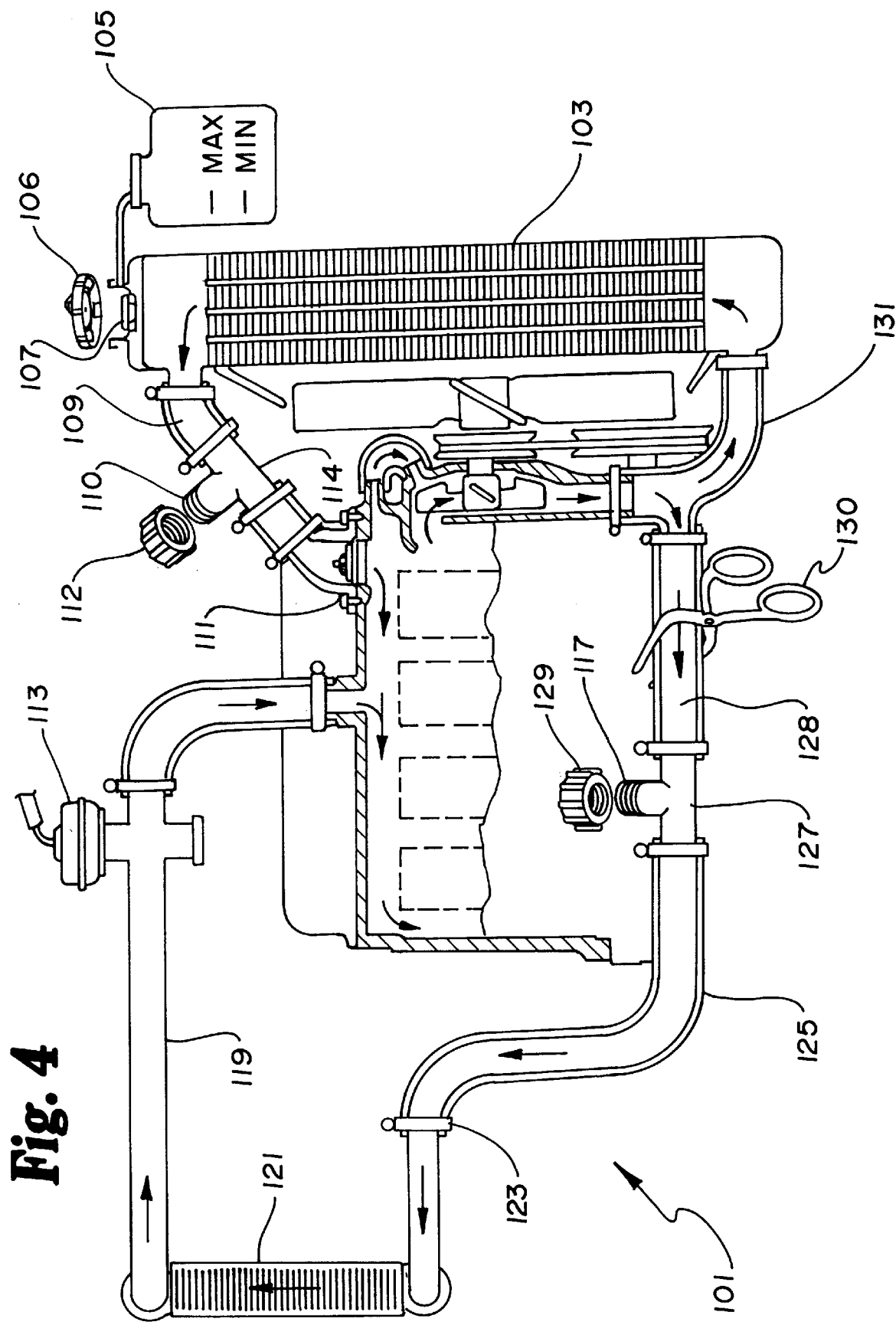
FIG. 4 is a schematic view of an internal combustion engine showing the connection sites for the lines from the coolant recycler of FIG. 1.

FIG. 1 schematically illustrates the apparatus of the invention and its description characterizes the process of the invention. Apparatus 1, comprises a plurality of lines, a pump 3, a holding tank 19, filtration cartridges 35, and an activated carbon bed cartridge 37. Each line is a tubing or hose depending on location and function. Connector 59 screws on directly or indirectly (via a connecting hose of the garden hose variety) to an engine's (101) cooling system Tee opening connection, such as 117 or 110, of Tees 127 and 114, respectively, as shown in FIG. 4. For example, connector 59 can be connected directly to another hose (not shown) which in turn is directly connected to the Tee opening 117 or 110. The other hose can be of the garden hose variety. Connector 67 connects directly or indirectly to a vehicle's radiator, such as at radiator's 103 opening 107, or to Tee opening connection 110, in FIG. 4 depending on whether a cross flow adapter or vertical flow adapter is used. Air inlet 49 is connected to an air supply source, not shown.

In pressure testing the cooling system of FIG. 4, the vacuum side to pump 3, in a closed loop cycle, comprises, as shown in FIG. 3, in series: tank 19, hose 23, through valve 81, through hose 31, through valve 32, through hose 15 feeds into pump 3. The pressure side comprises fluid fed into line 7 from pump 3, to eventually pass the fluid through connector 59 to the vehicle's heater hose.

As shown in FIG. 3, the pressure side of pump 3, comprises line 7 to two-way valve 71, then into line 29, to two-way valve 79. Fluid is then passed to line 43 through Tee 68 to connector 59, via Tee 61. Connector 59 is connected to Tee opening 117 or 110, as noted above. This creates a fluid cycle involving apparatus 1 and engine 101 cooling system.

As shown, a flushing Tee 127, with opening 117 and cap 129, is provided in the heater hose of engine 101. Following, the system involving recycler apparatus 1 coupled to engine's 101 cooling system is pressure tested by circulating fluid into the pressure side of the recycler 1 through the vacuum side, as stated above, through pump 3. Coolant is caused to flow from pump 3 through Tee 13, line 7, through two way valve 71, to Tee 73, through line 29 through two way valve 79, through line 43, through Tee 68, to Tee 61 and connector 59 attached to Tee connections 114 or 127. The preferred system uses a 30 psi system pressure gauge. Tee 61 is fitted with pressure relief valve 57 and flow from valve 57 goes to holding tank 19 via line 17.

In the evacuation step, with the radiator cap 106 on, which means that the opening at 107, FIG. 4, is covered by a standard radiator cap, overflow reservoir 105, FIG. 4, is caused to be evacuated. With the radiator cap 106 off, and connector 59 connected to Tee 127 through Tee opening 117, the cooling system of the vehicle is drained. In that case, Tee cap 129 is removed.

FIG. 4 illustrates the cooling system 101 of a typical vehicle. The components of the cooling system involve radiator 103, recovery or overflow tank 105, radiator opening 107, radiator cap 106, upper radiator hose 109 with Tee 114 containing opening 110 and associated cap 112, thermostat 111, heater control valve 113, supply heater hose 119, heater core 121, hose clamp 123, return heater hose 125, Tee 127, cap 129 for Tee opening 117, return hose 128 and lower radiator hose 131. Pinch plier 130 is provided to close off flow during the process, as desired.

Fluid circulation within cooling system 101 is shown in FIG. 4 by the arrows for back flushing out spent coolant and particulate matter accumulated in the cooling system. The fluid is evacuated from tank 19 through line 23, through three-way valve 81, through line 31, through two-way valve 32, through line 15, through pump 3, through Tee 13, through line 7, through valve 71, through Tee 73, through line 29, through two-way valve 79, through line 43, through Tee 68, through Tee 61, through connector 59, to Tee 127 of FIG. 4. The flushed fluid is passed from the engine via opening 107 through connector 67, through Tee 65, through check valve 66, through line 21, to tank 19.

In the recycle mode, the fluid flow on the vacuum side of the system comprises, in sequence, connector 67 (linked to either Tee 114 or 127 or opening 107, as the case may be), Tee 65, line 64, three-way valve 81, line 31, through two-way push button valve 32 into line 15 terminating at pump 3. On the pressure side, fluid flows from pump 3 through Tee 13, to which is connected a Tee linked to back pressure gauge 12 via line 11, and sample spigot 10 via line 9. The flow continues into line 7 to two-way valve 71 then to line 29 into two-way valve 79, then to line 43 into Tee 68, then through Tee 61 to connector 59. Fluid is passed from the engine via opening 107 through connector 67 through Tee 65, through line 64, through valve 81, through line 31, through valve 32, through line 15 to pump 3; and this recycle can include passage through the filters and carbon bed as described below. The initial priming of pump 3 involves the removal of coolant stored in tank 19 via line 23 to valve 81 then to line 31, valve 32 and line 15 into pump 3. Valve 81 is turned to initiate collection of fluid from the engine's cooling system. Air fed via line 49 passes through air regulator 51 and then into pump 3 by way of line 5.

FIG. 2 includes as part of recycler 1 addition system 2, as shown in FIG. 2A. Fluid chemical composition 88, such as SDDC, the basic coagulant polymer, inhibitors, pH adjustment chemicals, spent and fresh coolant, or mixtures of two or more of them, can be rapidly injected into the spent coolant undergoing treatment thereby avoiding undesirable air introduction and assuring maximum circulation of the additives in the spent coolant. In this embodiment, the vacuum (i.e., reduced pressure) created by the pump is the delivery means for rapidly injecting the additives into the spent coolant. Fluid chemical composition 88 is poured from its container 87 into basin 85 containing a slanting wall funnel connected to outlet tubing 84. In this embodiment, basin 85 contains ball 89 capable of floating on fluid chemical composition 88. The upper portion of tube 84 has a funnel shape that decreases in diameter as the tubing recedes from its connection to basin 85. The diameter of ball 89 is less than the opening between basin 85 and tube 84, but greater than the diameter of tube 84 below the opening. The bottom of tube 84 connects with tube 83 for passage of fluid chemical composition 88 through valve 32 into line 15, on the vacuum side of pump 3. Valve 32 is fitted with a push button switch that causes line 31 to become blocked when line 83 is opened. As a result, fluid chemical composition 88 is quickly aspirated into line 15 and into admixture with spent coolant in the line. This causes ball 89, floating on the fluid chemical composition 88, to be drawn into the opening between basin 85 and tube 84, and to become wedged in tube 84, thereby blocking tube 84, and preventing air from entering tube 83 and recycler 1.

SDDC and the basic polymer, as described above, are thus added to the spent coolant and with circulation through the system comprising recycler 1 and coolint system 101 without passage through the filters and the carbon bed, they are thoroughly mixed into the spent coolant. Under these conditions, they cause isolation of metal containing particulates that can be filtered from the coolant. Then circulating coolant is passed from pump 3, line 7, through valve 71, line 25 into filter canisters 35, attached in series and connected by line 26. The first canister that the fluid sees will have a coarser filter such as a 50 micron filter, and the second canister will contain a fine filter, such as a 5 micron filter. The fluid recovered from the second canister passes by way of line 39, through valve 75, Tee 77 and line 34, Tee 73, line 29, to valve 79, into line 43 to the cooling system and circulation to the vacuum side of pump 3, as stated above. This cycle is repeated for the desired duration, checking samples taken from sample spigot 10 for clarity, as indicated above, valve 75 is opened to cause the spent coolant to circulate through line 27 into carbon bed cannister 37, then out into line 41 to line 34, with the continuation of coolant circulation as spelled out above from the pressure side of pump 3 to the vacuum side of pump 3. After the carbon bed treatment, based on the sampling via sample spigot 10, valves 71 and 75 are closed and coolant is then passed, on the pressure side, from valve 71 to line 29 to valve 79. If desired, coolant can be recirculated via line 22 to tank 19 and then circulated through line 23 to valve 81 into line 31, through valve 32 into line 15 and into pump 3. An inhibitor package of chemicals, as described herein, can be added to basin 85 for aspiration into the coolant, using the procedure described above for SDDC and the basic polymer. The freezing point of the coolant can be checked via sampling of processed coolant at sample spigot 10, and if more ethylene glycol coolant is required, it too can be added by aspiration via basin 85. Once the desired freeze point is reached, recycler 1 can be turned off and detached from cooling system 101. The upper radiator hose 109 is reconnected to the radiator.

The pH of the ultimate recycled coolant is an important factor and a pH meter evaluating samples taken from sample spigot 10 can be used to make the appropriate adjustments. Chemical inhibitors and other additives can be added to the coolant through basin 85, after the filtration and carbon bed treatment have been completed. Typical chemicals to be added to the refurbished coolant are Engine Coolant Treatment 2792, made by The Penray Companies, Inc., Elk Grove Village, Ill., and a two-package inhibitor system sold by W. R. Grace & Co, Grace Dearborn Division, Lake Zurich, Ill. Penray's Engine Coolant Treatment 2792 contains the following:

| Component | % by Weight |
| --- | --- |
| Sodium metasilicate | 5 |
| Sodium tetraborate | 15 |
| Sodium hydroxide | 5 |
| Sodium nitrate | 5 |
| Sodium nitrite | 15 |
| 2-mercaptobenzothiazole | — |
| Sodium tolyltriazole | — |

The Grace Dearborn inhibitor package contains two additives. The first additive is designated as Dearborn CW-1606. It comprises about 15 weight % potassium hydroxide, 2 weight % sodium silicate and 2 weight % potassium nitrate. The other part of the Dearborn package is Dearborn CW-1607 and it contains phosphoric acid. Additive CW-1606 is added first and thoroughly mixed in the coolant before adding CW-1607. About four fluid ounces of each of them is added for every gallon of the coolant.

The Penray inhibitor is a one part inhibitor. If this inhibitor is used, 3 ounces per gallon of cooling system volume is added to basin 85.

The Grace Dearborn inhibitor is a two-part inhibitor. If this inhibitor is used, 4 ounces of the first part (Part 3) per gallon of cooling system volume, is added.

EXAMPLE

The entire sample for this experiment comprised approximately 14 gallons of recycled, inhibited coolant prepared by recycling three (3) 5.33 gallon batches of used coolant.

1. Recycling chemical preparation—Preparation of enough precipitant and coagulant to recycle one 5.33 gallon batch of used spent alkaline coolant in the coolant recycler such as illustrated in FIG. 1.
   a. Precipitant—12.6 ml. of undiluted Rochester Midland (Rochester, N.Y.) Midfloc 1300L (SDDC) was added to 145 ml of distilled water.
   b. Coagulant—78.8 ml. of ethylene glycol and 16.1 ml of 10.2 volume percent, anion-exchange resin (Rohm & Haas Amberlyst A27) treated Rochester Midland (Rochester, N.Y.) Midfloc 1320L (olyquaternary amine sold by Rochester Midland) was added to 62.7 ml. of distilled water.
      (1) The 10.2 volume percent, anion-exchange resin treated Rochester Midland Midfloc 1320L was produced by taking undiluted Rochester Midland Midfloc 1320L, diluting it with distilled water so that its concentration was 10.2 volume percent and then passing it through anion exchange resin to remove chloride ions and replace them with hydroxide ions.

2. Recycling—The equipment was a prototype of that described in FIG. 1 with the filter chambers having pressure gauges upstream and down stream of each filter chamber in addition to the two pressure gauges on the recycler control panel. There was a rotometer-style flow meter upstream and downstream of the filter chambers. The first filter chamber housed a 20 inch, nominal 50 micron retention Hytrex cartridge filter. The second filter chamber housed a 20 inch, nominal 5 micron retention Hytrex cartridge filter. The third filter chamber housed a 20 inch Ametek RFC-20 carbon cartridge. This carbon filter could be bypassed if desired.

3. Recycling process
   a. The recycler's tank was filled with 5.33 gallons of a used coolant. The 55 gallon drum which contained approximately 45 gallons of used coolant was agitated using an air diaphragm pump similar to the pump used in the recycler. The used coolant was pumped from the bottom of the 55 gallon drum and returned to the drum. A tee and section of tubing with a valve at the end of the tubing in the pump discharge line was used to fill a 3000 ml. pitcher. The pitcher was dumped into a 5 gallon bucket. The bucket was poured into the recycler tank. A total of 5.33 gallons were poured into the recycler tank.
   b. Recycling
      (1) The recycler's pump was started with the used coolant passing from the tank through the pump, through the 50 and the 5 micron particle filters and back to the tank. The flow rate was approximately 2 gallons per minute.
      (2) Then 157.6 ml. of the precipitant was poured into the recycler tank followed by 157.6 ml. of the coagulant approximately a minute or two later.
      (3) The coolant circulated for approximately 15 to 20 minutes.
      (4) The carbon filter which had been bypassed was now engaged.
      (5) Coolant circulated for approximately 10 to 15 more minutes.
      (6) The recycled, uninhibited coolant was pumped into a 5 gallon pail.
      (7) Approximately 5 samples were taken during the recycling operation to monitor progress.
      (8) This operation was repeated for the other two 5.33 gallon batches of used coolant.
   c. Blending and inhibiting
      (1) 12.5 gallons of product from the three recycler operations were placed in a 14 gallon tank for blending.
      (2) 3930 ml. of distilled water was added to raise the freeze point from approximately −51° F. to −39° F.
      (3) Added to the diluted coolant product as described above, with thorough mixing, was four fluid ounces for every gallon of the coolant of Grace Dearborn inhibitor CW1878 which comprises 0.0045 vol. fraction of Belclene 200 (Aqueous solution of poly (maleic acid) [homopolymer of 2-butenedioic acid], now sold by FMC Corporation, Process Additive Division, 1735 Market St., Philadelphia, Pa. 19103) and 0.9955 vol. fraction of CW-1606. Then four fluid ounces for every gallon of the coolant of Grace Dearborn inhibitor of CW-1879 (same as CW-1607) was thoroughly mixed in the treated diluted coolant.

Analytical evaluation of the treated coolant is set forth in the following table. The results of the analytical evaluation are compared to current ASTM standards and a current General Motors ("GM") standard for concentrates.

| | REQUIRED SPECIFICATIONS | | |
| --- | --- | --- | --- |
| ASTM TEST DESCRIPTION | D3306 ASTM NEW Concentrate 4/16/91 | GM 1825M GM NEW Concentrate (as of 09/17/92) | Example |
| D 1122 Specific gravity | 1.110 to 1.145 | 1.11 to 1.14 | 1.09 |
| D 1177 Freezing point, 50% dilute | −34° F./ −37° C. max | −34° F./ −37° C. max | −42.6° C. |
| D 1120 Boiling point: Concentrate | 325° F./ 183° C. max | 300° F./149° C. | — |
| 50% dilute | 226° F./ 107.8° C. min | — | 107.8° C. |

-continued

| ASTM TEST DESCRIPTION | D3306 ASTM NEW Concentrate 4/16/91 | GM 1825M GM NEW Concentrate (as of 09/17/92) | Example |
|---|---|---|---|
| D 1882 Effect on automotive finish | No effect | No effect | No effect |
| D 1119 Ash content (mass %) | 5 max | 5 max | 1.4 |
| D 1287 pH, 50% vol distilled water | 7.5 to 11.0 | 7 to 11 | 9.6 |
| D 3634 Chloride (ppm) | 25 max | — | 45.2 |
| D 1123 Water (mass %) | 5 max | 5 max | 46.5 |
| D 1121 Reserve alkalinity | Report | 10 min | 11.1 |
| D 3306 notes: Color | Distinctive | Distinct green | Green |
| Effects on non metals | No adverse effect | None on hoses, gaskets, coatings | No effect |
| Storage stability | — | Slight cloudiness and ppt. | Clear, no ppt. -PASS- |
| D 1384 - Corrosion in glassware, weight loss (mg) | | | |
| Copper | 10 max | 20 max | 3 |
| Solder | 30 max | 20 max | 3 |
| Brass | 10 max | 10 max | 1 |
| Steel | 10 max | 10 max | 1 |
| Cast Iron | 10 max | 10 max | 2 |
| Aluminum | 30 max | 20 max | 0 |
| D 2570 - Simulated service, weight loss (mg) | | | |
| Copper | 20 max | 20 max | 10 |
| Solder | 60 max | 40 max | 2 |
| Brass | 20 max | 20 max | 17 |
| Steel | 20 max | 20 max | 2 |
| Cast Iron | 20 max | 20 max | 2 |
| Aluminum | 60 max | 40 max | 0 |
| Reserve alkalinity % change after D2470 | — | 25 max | 2.2 |
| D 4340 - Corrosion of cast aluminum alloys at heat rejecting surfaces (mg/cm2/wk) | 1.0 max | 1.0 max | 0.28 |
| D 1881 Foaming: Volume (ml) | 150 max | 50 max | 25 |
| Break time (sec) | 5 max | 5 max | 1.2 |
| D 2809 Cavitation-Erosion | 8 min | 8 min | 8* |
| Pitting | 8 min | — | — |
| Appearance | — | — | 44% Green |
| CONSTITUENTS | | | |
| Ethylene Glycol (wt. %) | — | 85 min | 54 |
| Other Glycols (wt. %) | — | 10 max | — |
| Total dissolved solids after filtration | — | — | 14000 |
| Heavy metals (ppm) | | | |
| Fe | — | — | <0.1 |
| Cu | — | — | <0.1 |
| Zn | — | — | — |
| Al | — | — | <0.5 |
| Pb | — | — | <0.2 |
| Glycol degrade products (mg/l) | | | |
| Glycolate/Formate | — | — | 7100 |
| Nitrite Nitrogen (NO2) | — | No addition | 52 (None added) |
| Chloride (Cl) | — | No limit | 59 |
| Sulphate (SO4) | — | — | 340 |

Legends:
CONCENTRATE - New undiluted antifreeze.
PRE-DILUTE - Recycled antifreeze before diluting 50% with water.
*Rerun through a 5 micron filter An advantage of the use of a basic coagulating agent is that it will not introduce chloride into the treatment of the spent alkaline coolant. Chloride, as note above, deleteriously attacks the protective oxide layer of the engine block, and therefore it is desirable to avoid its presence. In addition the polyquaternary coagulating agents described possess the capability of sequestering and tying up chloride, and to some extent, the basic coagulating agent of the invention acts like an anion exchange resin, serving to reduce the presence of strongly acidic anions, such as chloride, in the coolant, thus returning less of the anions to the engine on recycling.

We claim:

1. An apparatus for the treatment of spent alkaline coolant taken from an internal combustion engine with a cooling system, which comprises:
    a) a pump with a pressure side and a vacuum side, an inlet and outlet for the pump, lines to the vacuum side of the pump and lines extending from the pressure side of the pump, a holding tank, air inlets for the pump, at least one filter and a bed of carbon particles;
    b) optionally, a connecting line from the cooling system of the internal combustion engine for providing fluid connection to one side of the pump;
    c) optionally, a second connecting line from the cooling system of the internal combustion engine for providing fluid connection to the other side of the pump;
    d) optional linkage of one or more of the connecting lines to the holding tank, and then to one or more sides of the pump; and
    e) the filter and bed of carbon particles being in fluid connection with one or more sides of the pump and the holding tank being in flow communication with the pump and means, including said pump, for circulating the coolant through the filter and bed of carbon particles as one pass, and for circulating the coolant through the filter as a subsequent pass.

2. The apparatus of claim 1 wherein there is an aspirator means connected to the vacuum side of the pump.

3. The apparatus of claim 2 wherein the aspirator means connected to the vacuum side of the pump is attached to a receptacle.

4. The apparatus of claim 3 wherein the receptacle contains a cut off means for terminating aspiration.

5. The apparatus of claim 1, wherein the means for circuiting includes a selectively positionable valve.

6. The apparatus of claim 1, wherein said filter comprises at least two filters, one being more porous than the other.

7. The apparatus of claim 1, further comprising at least one sampling spigot.

8. An apparatus for the treatment of scent alkaline coolant taken from an internal combustion engine with a cooling system which, comprises:
    a) a pump with a pressure side and a vacuum side, an inlet and outlet for the pump, lines to the vacuum side of the pump and lines extending from the pressure side of the pump, a holding tank, air inlets for the pump, at least one filter and a bed of carbon particles;

b) an aspirator means connected to the vacuum side of the pump, said aspirator means attached to a receptacle containing a cut off means for terminating aspiration, wherein the cut off means is capable of blocking passage of air to the pressure side of the pump;

c) optionally, a connecting line from the cooling system of the internal combustion engine for providing fluid connection to one side of the pump;

d) optionally, a second connecting line from the cooling system of the internal combustion engine for providing fluid connection to the other side of the pump;

e) optional linkage of one or more of the connecting lines to the holding tank, and then to one or more sides of the pump; and f) the filter and bed of carbon particles in fluid connection with one or more sides of the pump and the holding tank being in flow communication with the pump and means, including the pump, for circulating coolant through the filter and bed of carbon particles as one pass, and for circulating the coolant through the filter as a subsequent pass.

* * * * *